US007370013B1

(12) United States Patent
Aziz et al.

(10) Patent No.: US 7,370,013 B1
(45) Date of Patent: May 6, 2008

(54) APPROACH FOR DETERMINING AN AMOUNT TO BILL A CUSTOMER FOR THE USE OF RESOURCES

(75) Inventors: Ashar Aziz, Fremont, CA (US); Thomas Markson, San Mateo, CA (US); Martin Patterson, Mountain View, CA (US); Mark Gray, Mountain View, CA (US); Christopher J. Conway, Palo Alto, CA (US); Patrick A Tickle, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 743 days.

(21) Appl. No.: 09/911,925

(22) Filed: Jul. 23, 2001

Related U.S. Application Data

(63) Continuation-in-part of application No. 09/502,170, filed on Feb. 11, 2000, now Pat. No. 6,779,016.

(60) Provisional application No. 60/150,394, filed on Aug. 23, 1999.

(51) Int. Cl.
*G06Q 40/00* (2006.01)
(52) U.S. Cl. .............................. 705/40; 705/5; 709/202
(58) Field of Classification Search .................... 705/5, 705/40
See application file for complete search history.

(56) References Cited

U.S. PATENT DOCUMENTS

| | | | |
|---|---|---|---|
| 4,591,967 A | 5/1986 | Mattes et al. | |
| 5,163,130 A | 11/1992 | Hullot | |
| 5,504,670 A | 4/1996 | Barth et al. | |
| 5,574,914 A | 11/1996 | Hancock et al. | |
| 5,590,284 A | 12/1996 | Crosetto | |
| 5,659,786 A | 8/1997 | George et al. | |
| 5,751,967 A | 5/1998 | Raab et al. | |
| 5,819,042 A | 10/1998 | Hansen | |
| 5,821,937 A | 10/1998 | Tonelli et al. | |
| 5,878,232 A | 3/1999 | Marimuthu | |
| 5,930,773 A * | 7/1999 | Crooks et al. | 705/30 |
| 5,943,656 A * | 8/1999 | Crooks et al. | 705/30 |
| 5,951,683 A | 9/1999 | Yuuki et al. | |
| 5,974,563 A | 10/1999 | Beeler, Jr. | |
| 6,182,139 B1 | 1/2001 | Brendel | |
| 6,219,699 B1 | 4/2001 | McGloghrie et al. | |
| 6,223,218 B1 | 4/2001 | Iijima et al. | |
| 6,230,200 B1 | 5/2001 | Forecast et al. | |
| 6,381,321 B1 | 4/2002 | Brown et al. | |
| 6,389,432 B1 | 5/2002 | Pothapragada et al. | |
| 6,446,141 B1 | 9/2002 | Nolan et al. | |
| 6,466,559 B1 | 10/2002 | Johansson et al. | |
| 6,505,229 B1 | 1/2003 | Turner et al. | |
| 6,597,956 B1 | 7/2003 | Aziz et al. | |
| 6,779,016 B1 * | 8/2004 | Aziz et al. | 709/201 |
| 7,020,626 B1 * | 3/2006 | Eng et al. | 705/27 |

FOREIGN PATENT DOCUMENTS

| | | |
|---|---|---|
| EP | 0 262 750 A2 | 4/1988 |
| EP | 0 490 624 A2 | 6/1992 |
| EP | 0 750 256 A2 | 12/1996 |
| EP | 0 791 881 A1 | 8/1997 |
| EP | 0 905 621 A1 | 3/1999 |
| EP | 0 917 056 A2 | 5/1999 |
| EP | 0 935 200 A1 | 8/1999 |
| WO | WO 97/49214 A1 | 12/1997 |
| WO | WO 99/57957 A2 | 11/1999 |
| WO | WO 00/29954 A1 | 5/2000 |

OTHER PUBLICATIONS

Fox, Armando, et al., "Cluster-Based Scalable Network Services," pp. 78-91, Operating Systems Review (SIGOPS), US, ACM Headquarter, New York, vol. 31, No. 5, Dec. 1, 1997, XP-000771023.
Harold, Elliotte Rusty, "XML: Extensible Markup Language," 1998, pp. 1-431.

(Continued)

*Primary Examiner*—Richard C Weisberger
(74) *Attorney, Agent, or Firm*—Hickman Palermo Truong & Becker LLP

(57) ABSTRACT

A novel approach for determining an amount to be billed to a customer for the use of resources is based upon usage data and value data. The usage data indicates usage, by the customer, of a set of one or more resources during a specified period of time. The set of one or more resources may be dynamically selected and de-selected from a plurality of resources at any time. For example, the set of one or more resources may comprise a VSF as described herein. The value data indicates generally value provided by each resource from the set of one or more resources used during the specified period of time. The value provided by each resource may be expressed in service units per unit time and a charge may be applied for each service unit consumed during a specified period of time. Example billing schemes to which the approach is applicable include, without limitation, basic billing, flex billing, event flex billing and open flex billing.

31 Claims, 18 Drawing Sheets

OTHER PUBLICATIONS

Muller, Nathan J., "Design and Conquer," Oct. 1996, *BYTE*, vol. 21, No. 10, XP 000683573, pp. 93-98.

Prud'Hommeaux, Eric, "XML-based HTTP Server Configuration Language," http://www.w3.org/1999/07/9-http-server-conf.html, Sep. 7, 1999, XP-002152599, pp. 1-5.

Short, Rob, et al., "Windows NT Clusters for Availability and Scalability," 1997 IEEE, pp. 8-13.

Vingralek, Radek, et al., "Snowball: Scalable Storage on Networks of Workstations with Balanced Load," pp. 117-156, Distributed and Parallel Databases vol. 6, No. 2, Apr. 1998, XP-002162201.

* cited by examiner

APPROACH FOR DETERMINING AN AMOUNT TO BILL A CUSTOMER FOR THE USE OF RESOURCES

RELATED APPLICATIONS

This application is a continuation-in-part application of and claims priority to U.S. patent application Ser. No. 09/502,170 entitled "Extensible Computing System," filed on Feb. 11, 2000 now U.S. Pat. No. 6,779,016, by Ashar Aziz, Tom Markson and Martin Patterson, the entire contents of which are incorporated herein by reference in their entirety for all purposes, which claims priority to U.S. Provisional Patent Application No. 60/150,394 entitled "Extensible Computing System," filed on Aug. 23, 1999, by Ashar Aziz, Tom Markson and Martin Patterson.

FIELD OF THE INVENTION

The present invention relates to rental models for resources, and more specifically, to a computer-implemented approach for determining an amount to bill a customer for the use of resources.

BACKGROUND OF THE INVENTION

Builders of Web sites and other computer systems today are faced with many challenging systems planning issues. These issues include capacity planning, site availability and site security. Accomplishing these objectives requires finding and hiring trained personnel capable of engineering and operating a site, which may be potentially large and complicated. This has proven to be difficult for many organizations because designing, constructing and operating large sites is often outside their core business.

One approach has been to host an enterprise Web site at a third party site, co-located with other Web sites of other enterprises. Such outsourcing facilities are currently available from companies such as Exodus, AboveNet, Global-Center, etc. These facilities provide physical space and redundant network and power facilities shared by multiple customers.

Although outsourcing web site hosting greatly reduces the task of establishing and maintaining a web site, it does not relieve a company of all of the problems associated with maintaining a web site. Companies must still perform many tasks relating to their computing infrastructure in the course of building, operating and growing their facilities. Information technology managers of the enterprises hosted at such facilities remain responsible for manually selecting, installing, configuring, and maintaining their own computing equipment at the facilities. The managers must still confront difficult issues such as resource planning and handling peak capacity. Specifically, managers must estimate resource demands and request resources from the outsourcing company to handle the demands. Many managers ensure sufficient capacity by requesting substantially more resources than are needed to provide a cushion against unexpected peak demands. Unfortunately, this often results in significant amounts of unused capacity that increases companies' overhead for hosting their web sites.

Even when outsourcing companies also provide complete computing facilities including servers, software and power facilities, the facilities are no easier to scale and grow for the outsourcing company, because growth involves the same manual and error-prone administrative steps. In addition, problems remain with capacity planning for unexpected peak demand. In this situation, the outsourcing companies often maintain significant amounts of unused capacity.

Further, Web sites managed by outsourcing companies often have different requirements. For example, some companies may require the ability to independently administer and control their Web sites. Other companies may require a particular type or level of security that isolates their Web sites from all other sites that are co-located at an outsourcing company. As another example, some companies may require a secure connection to an enterprise Intranet located elsewhere.

Also, various Web sites differ in internal topology. Some sites simply comprise a row of Web servers that are load balanced by a Web load balancer. Suitable load balancers are Local Director from Cisco Systems, Inc., BigIP from F5Labs, Web Director from Alteon, etc. Other sites may be constructed in a multi-tier fashion, whereby a row of Web servers handle Hypertext Transfer Protocol (HTTP) requests, but the bulk of the application logic is implemented in separate application servers. These application servers in turn may need to be connected back to a tier of database servers.

Some of these different configuration scenarios are shown in FIG. 1A, FIG. 1B, and FIG. 1C. FIG. 1A is a block diagram of a simple Web site, comprising a single computing element or machine 100 that includes a CPU 102 and disk 104. Machine 100 is coupled to the global, packet-switched data network known as the Internet 106, or to another network. Machine 100 may be housed in a co-location service of the type described above.

FIG. 1B is a block diagram of a 1-tier Web server farm 110 comprising a plurality of Web servers WSA, WSB, WSC. Each of the Web servers is coupled to a load-balancer 112 that is coupled to Internet 106. The load balancer divides the traffic between the servers to maintain a balanced processing load on each server. Load balancer 112 may also include or may be coupled to a firewall for protecting the Web servers from unauthorized traffic.

FIG. 1C shows a 3-tier server farm 120 comprising a tier of Web servers W1, W2, etc., a tier of application servers A1, A2, etc., and a tier of database servers D1, D2, etc. The Web servers are provided for handling HTTP requests. The application servers execute the bulk of the application logic. The database servers execute database management system (DBMS) software.

Given the diversity in topology of the kinds of Web sites that need to be constructed and the varying requirements of the corresponding companies, it may appear that the only way to construct large-scale Web sites is to physically custom build each site. Indeed, this is the conventional approach. Many organizations are separately struggling with the same issues, and custom building each Web site from scratch. This is inefficient and involves a significant amount of duplicate work at different enterprises.

Still another problem with the conventional approach is resource and capacity planning. A Web site may receive vastly different levels of traffic on different days or at different hours within each day. At peak traffic times, the Web site hardware or software may be unable to respond to requests in a reasonable time because it is overloaded. At other times, the Web site hardware or software may have excess capacity and be underutilized. In the conventional approach, finding a balance between having sufficient hardware and software to handle peak traffic, without incurring excessive costs or having over-capacity, is a difficult problem. Many Web sites never find the right balance and chronically suffer from under-capacity or excess capacity.

Yet another problem is failure induced by human error. A great potential hazard present in the current approach of using manually constructed server farms is that human error in configuring a new server into a live server farm can cause the server farm to malfunction, possibly resulting in loss of service to users of that Web site.

Another issue is related to the way in which customers are billed for the use of resources. Conventional approaches for billing customers for the use of resources generally involve billing customers for the use of a number of dedicated resources during a specified period of time. For example, the owner of a Website might pay a monthly fee for exclusive use of a server and a secure high-speed Internet connection. In some situations, customers may also be charged for an amount of space required to maintain the resources rented by the customer. This may occur, for example, in the context of Internet Web serves that are co-located in a single facility in so called "server cages." As used herein, the term "resource" refers to any type of resource. Examples of resources include, without limitation, computing resources such as processors, storage resources such as volatile or non-volatile storage, e.g., random access memory or hard disk storage, network resources such as load balancers and firewalls, and communications resources, such as communications links, e.g., Internet or network connections.

One significant problem with these approaches is that customers must pay for the use of all of their assigned resources for the specified period of time, regardless of how much the resources are actually used. Since many customers' computing resource needs vary significantly throughout the specified period of time, customers often end up paying for resources that are not used.

Consider the owner of a Website that pays a monthly fee to lease a server and high-speed Internet connection to host the owner's Website. During each month, and in fact throughout each day, the actual use of the server and high-speed Internet connection may vary dramatically. For example, during times of peak demand, e.g., during business hours, the server and high-speed Internet connection may be heavily loaded. During times of off-peak demand, such as night hours and weekends, the server and high-speed Internet connection may be under utilized and in some situations may even be idle. Despite the variations in demand, the owner must rent sufficient resources to adequately handle peak demand, even though the peak demand may occur relatively infrequently. As a result, the owner must pay for the use of resources that are not fully utilized and in some circumstances, may not be used at all.

Given the need for leasing resources and the limitations in prior approaches, an approach for determining an amount to bill a customer for the use of resources that does not suffer from limitations associated with conventional approaches is highly desirable.

SUMMARY OF THE INVENTION

According to one aspect of the invention, a method and apparatus is provided for creating highly scalable, highly available and secure data processing sites, based on a wide scale computing fabric ("computing grid"). The computing grid is physically constructed once, and then logically divided up for various organizations on demand. The computing grid comprises a large plurality of computing elements that are coupled to one or more VLAN switches and to one or more storage area network (SAN) switches. A plurality of storage devices are coupled to the SAN switches and may be selectively coupled to one or more of the computing elements through appropriate switching logic and commands. One port of the VLAN switch is coupled to an external network, such as the Internet. A supervisory mechanism, layer, machine or process is coupled to the VLAN switches and SAN switches.

Initially, all storage devices and computing elements are assigned to Idle Pools. Under program control, the supervisory mechanism dynamically configures the VLAN switches and SAN switches to couple their ports to one or more computing elements and storage devices. As a result, such elements and devices are logically removed from the Idle Pools and become part of one or more virtual server farms (VSFs). Each VSF computing element is pointed to or otherwise associated with a storage device that contains a boot image usable by the computing element for bootstrap operation and production execution. By physically constructing the computing grid once, and securely and dynamically allocating portions of the computing grid to various organizations on demand, economies of scale are achieved that are difficult to achieve when doing a custom build of each site.

According to one aspect of the invention, a novel approach is provided for determining an amount to be billed to a customer for the use of resources. According to the approach, the amount to be billed to the customer is determined based upon usage data and value data. The usage data indicates usage, by the customer, of a set of one or more resources during a specified period of time. The value data indicates generally value provided by each resource, from the set of one or more resources, used during the specified period of time.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1C is a block diagram of a three-tier Web server farm.

DETAILED DESCRIPTION OF THE INVENTION

Figure 1A:
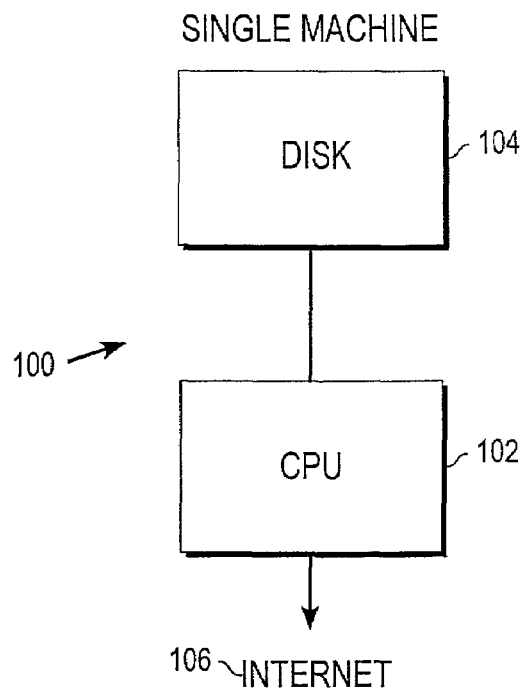
FIG. 1A is a block diagram of a simple Web site having a single computing element topology.
Figure 1B:
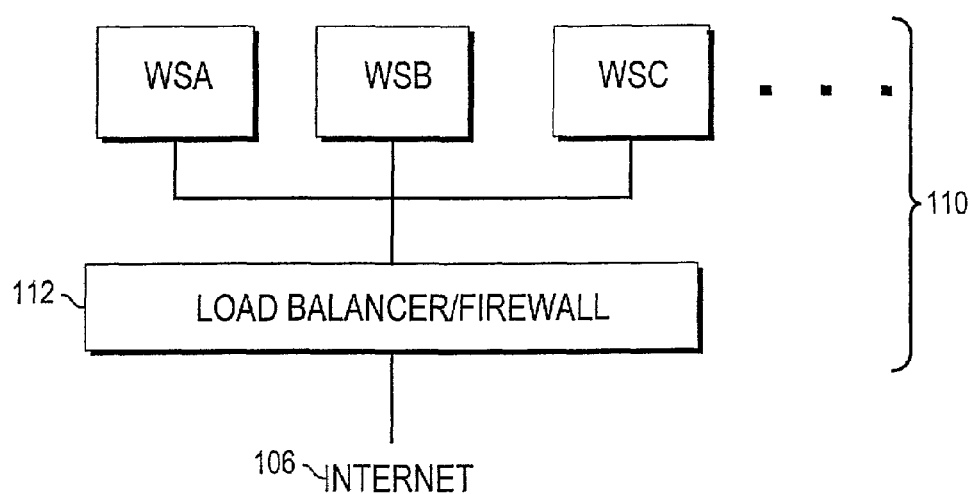
FIG. 1B is a block diagram of a one-tier Web server farm.
Figure 16:
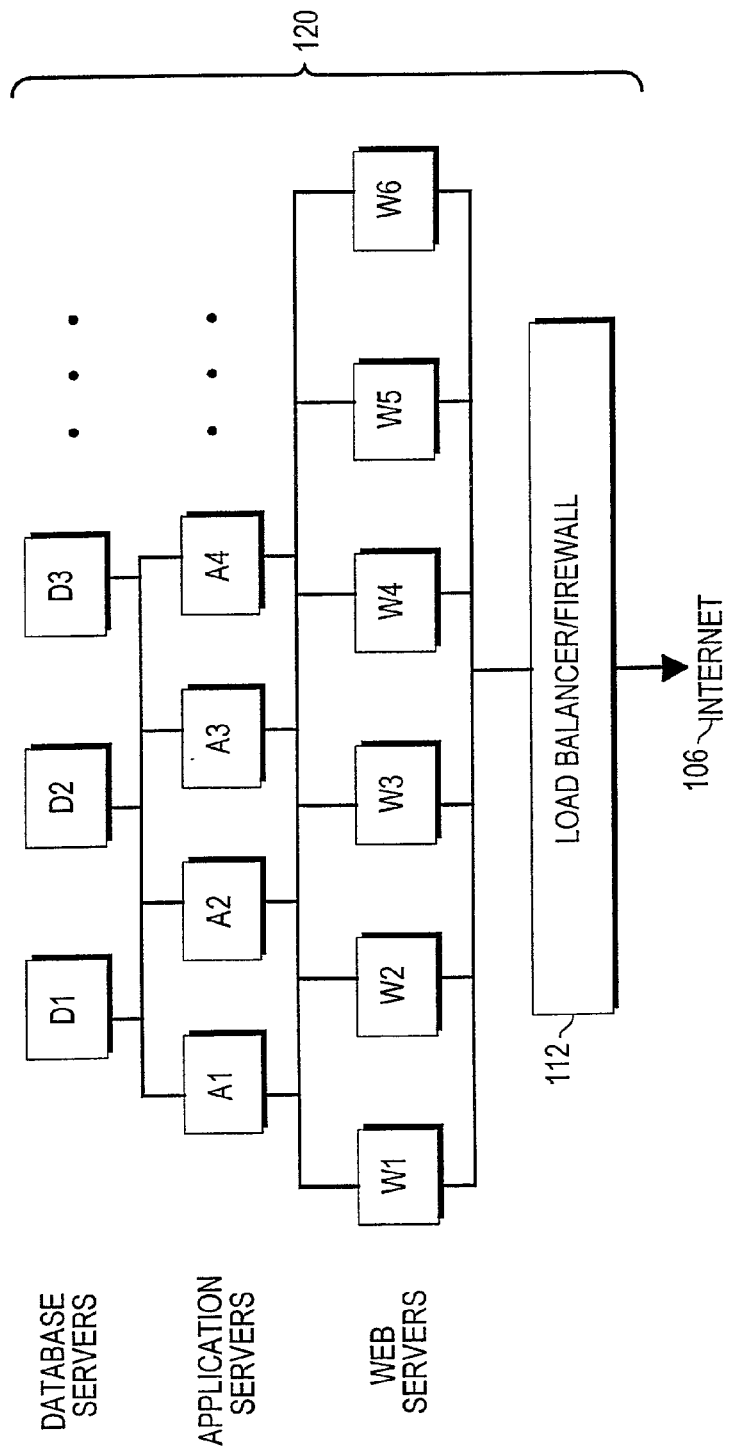

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Virtual Server Farm (VSF)

According to one embodiment, a wide scale computing fabric ("computing grid") is provided. The computing grid may be physically constructed once, and then logically partitioned on demand. A part of the computing grid is allocated to each of a plurality of enterprises or organizations. Each organization's logical portion of the computing grid is referred to as a Virtual Server Farm (VSF). Each organization retains independent administrative control of its VSF. Each VSF can change dynamically in terms of number of CPUs, storage capacity and disk and network bandwidth based on real-time demands placed on the server farm or other factors. Each VSF is secure from every other organization's VSF, even though they are all logically created out of the same physical computing grid. A VSF can be connected back to an Intranet using either a private leased line or a Virtual Private Network (VPN), without exposing the Intranet to other organizations' VSFs.

An organization can access only the data and computing elements in the portion of the computing grid allocated to it, that is, in its VSF, even though it may exercise full (e.g. super-user or root) administrative access to these computers and can observe all traffic on Local Area Networks (LANs) to which these computers are connected. According to one embodiment, this is accomplished using a dynamic firewalling scheme, where the security perimeter of the VSF expands and shrinks dynamically. Each VSF can be used to host the content and applications of an organization that may be accessed via the Internet, Intranet or Extranet.

Configuration and control of the computing elements and their associated networking and storage elements is performed by a supervisory mechanism that is not directly accessible through any of the computing elements in the computing grid. For convenience, in this document the supervisory mechanism is referred to generally as a control plane and may comprise one or more processors or a network of processors. The supervisory mechanism may comprise a Supervisor, Controller, etc. Other approaches may be used, as described herein.

The control plane is implemented on a completely independent set of computing elements assigned for supervisory purposes, such as one or more servers that may be interconnected in a network or by other means. The control plane performs control actions on the computing, networking and storage elements of the computing grid through special control ports or interfaces of the networking and storage elements in the grid. The control plane provides a physical interface to switching elements of the system, monitors loads of computing elements in the system, and provides administrative and management functions using a graphical user interface or other suitable user interface.

Computers used to implement the control plane are logically invisible to computers in the computing grid (and therefore in any specific VSF) and cannot be attacked or subverted in any way via elements in the computing grid or from external computers. Only the control plane has physical connections to the control ports on devices in the computing grid, which controls membership in a particular VSF. The devices in the computing can be configured only through these special control ports, and therefore computing elements in the computing grid are unable to change their security perimeter or access storage or computing devices which they are not authorized to do.

Thus, a VSF allows organizations to work with computing facilities that appear to comprise a private server farm, dynamically created out of a large-scale shared computing infrastructure, namely the computing grid. A control plane coupled with the computing architecture described herein provides a private server farm whose privacy and integrity is protected through access control mechanisms implemented in the hardware of the devices of the computing grid.

The control plane controls the internal topology of each VSF. The control plane can take the basic interconnection of computers, network switches and storage network switches described herein and use them to create a variety of server farm configurations. These include but are not limited to, single-tier Web server farms front-ended by a load balancer, as well as multi-tier configurations, where a Web server talks to an application server, which in turn talks to a database server. A variety of load balancing, multi-tiering and firewalling configurations are possible.

The Computing Grid

The computing grid may exist in a single location or may be distributed over a wide area. First this document describes the computing grid in the context of a single building-sized network, composed purely of local area technologies. Then the document describes the case where the computing grid is distributed over a wide area network (WAN).

Figure 2:
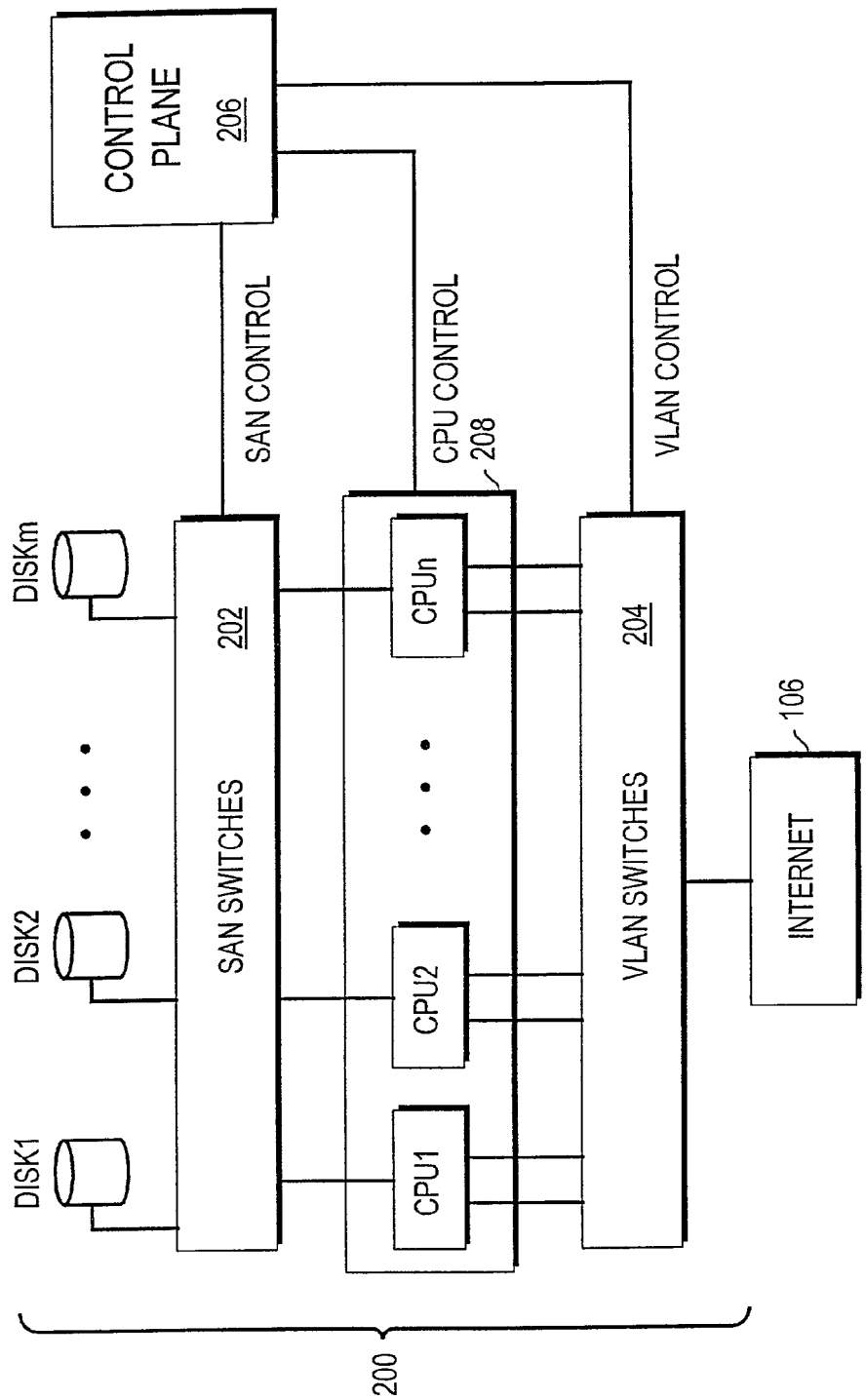
FIG. 2 is a block diagram of one configuration of an extensible computing system 200 that includes a local computing grid.

FIG. 2 is a block diagram of one configuration of an extensible computing system 200 that includes a local computing grid 208. In this document "extensible" generally means that the system is flexible and scalable, having the capability to provide increased or decreased computing power to a particular enterprise or user upon demand. The local computing grid 208 is composed of a large number of computing elements CPU1, CPU2, . . . CPUn. In an exemplary embodiment, there may be 10,000 computing elements, or more. These computing elements do not contain or store any long-lived per-element state information, and therefore may be configured without persistent or non-volatile storage such as a local disk. Instead, all long lived state information is stored separate from the computing elements, on disks DISK1, DISK2, . . . DISKn that are coupled to the computing elements via a Storage Area Network (SAN) comprising one or more SAN Switches 202. Examples of suitable SAN switches are commercially available from Brocade and Excel.

All of the computing elements are interconnected to each other through one or more VLAN switches 204 which can be divided up into Virtual LANs (VLANs). The VLAN switches 204 are coupled to the Internet 106. In general a computing element contains one or two network interfaces connected to the VLAN switch. For the sake of simplicity, in FIG. 2 all nodes are shown with two network interfaces, although some may have less or more network interfaces. Many commercial vendors now provide switches supporting VLAN functionality. For example, suitable VLAN switches are commercially available from Cisco Systems, Inc. and Xtreme Networks. Similarly there are a large number of commercially available products to construct SANs, including Fibre Channel switches, SCSI-to-Fibre-Channel bridging devices, and Network Attached Storage (NAS) devices.

Control plane 206 is coupled by a SAN Control path, CPU Control path, and VLAN Control path to SAN switches 202, CPUs CPU 1, CPU2, . . . CPUn, and VLAN Switches 204, respectively.

Each VSF is composed of a set of VLANs, a set of computing elements that are attached to the VLANs, and a subset of the storage available on the SAN that is coupled to the set of computing elements. The subset of the storage available on the SAN is referred to as a SAN Zone and is protected by the SAN hardware from access from computing elements that are part of other SAN zones. Preferably, VLANs that provide non-forgeable port identifiers are used to prevent one customer or end user from obtaining access to VSF resources of another customer or end user.

Figure 3:
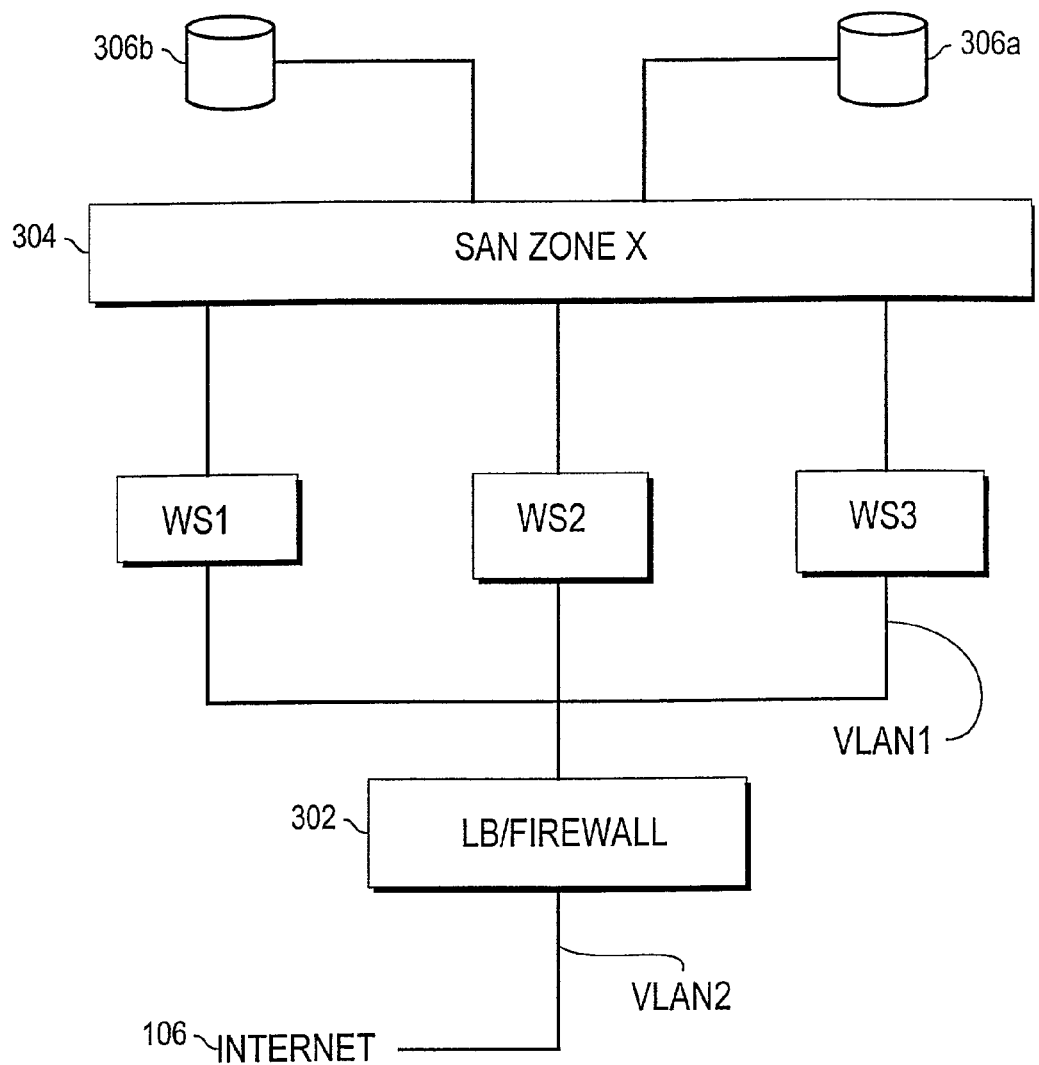
FIG. 3 is a block diagram of an exemplary virtual server farm featuring a SAN Zone.

FIG. 3 is a block diagram of an exemplary virtual server farm featuring a SAN Zone. A plurality of Web servers WS1, WS2, etc., are coupled by a first VLAN (VLAN1) to a load balancer (LB)/firewall 302. A second VLAN (VLAN2) couples the Internet 106 to the load balancer (LB)/firewall 302. Each of the Web servers may be selected from among CPU1, CPU2, etc., using mechanisms described further herein. The Web servers are coupled to a SAN Zone 304, which is coupled to one or more storage devices 306*a*, 306*b*.

At any given point in time, a computing element in the computing grid, such as CPU1 of FIG. 2, is only connected to the set of VLANs and the SAN zone(s) associated with a single VSF. A VSF typically is not shared among different organizations. The subset of storage on the SAN that belongs to a single SAN zone, and the set of VLANs associated with it and the computing elements on these VLANs define a VSF.

By controlling the membership of a VLAN and the membership of a SAN zone, control plane enforces a logical partitioning of the computing grid into multiple VSFs. Members of one VSF cannot access the computing or storage resources of another VSF. Such access restrictions are enforced at the hardware level by the VLAN switches, and by port-level access control mechanisms (e.g., zoning) of SAN hardware such as Fibre Channel switches and edge devices such as SCSI to Fibre Channel bridging hardware. Computing elements that form part of the computing grid are not physically connected to the control ports or interfaces of the VLAN switches and the SAN switches, and therefore cannot control the membership of the VLANs or SAN zones. Accordingly, the computing elements of the computing grid cannot access computing elements not located in the VSF in which they are contained.

Only the computing elements that run the control plane are physically connected to the control ports or interface of the devices in the grid. Devices in the computing grid (computers, SAN switches and VLAN switches) can only be configured through such control ports or interfaces. This provides a simple yet highly secure means of enforcing the dynamic partitioning of the computing grid into multiple VSFs.

Each computing element in a VSF is replaceable by any other computing element. The number of computing elements, VLANs and SAN zones associated with a given VSF may change over time under control of the control plane.

In one embodiment, the computing grid includes an Idle Pool that comprises large number of computing elements that are kept in reserve. Computing elements from the Idle Pool may be assigned to a particular VSF for reasons such as increasing the CPU or memory capacity available to that VSF, or to deal with failures of a particular computing element in a VSF. When the computing elements are configured as Web servers, the Idle Pool serves as a large "shock absorber" for varying or "bursty" Web traffic loads and related peak processing loads.

The Idle Pool is shared between many different organizations, and therefore it provides economies of scale, since no single organization has to pay for the entire cost of the Idle Pool. Different organizations can obtain computing elements from the Idle Pool at different times in the day, as needed, thereby enabling each VSF to grow when required and shrink when traffic falls down to normal. If many different organizations continue to peak at the same time and thereby potentially exhaust the capacity of the Idle Pool, the Idle Pool can be increased by adding more CPUs and storage elements to it (scalability). The capacity of the Idle Pool is engineered so as to greatly reduce the probability that, in steady state, a particular VSF may not be able to obtain an additional computing element from the Idle Pool when it needs to.

Figure 4A:
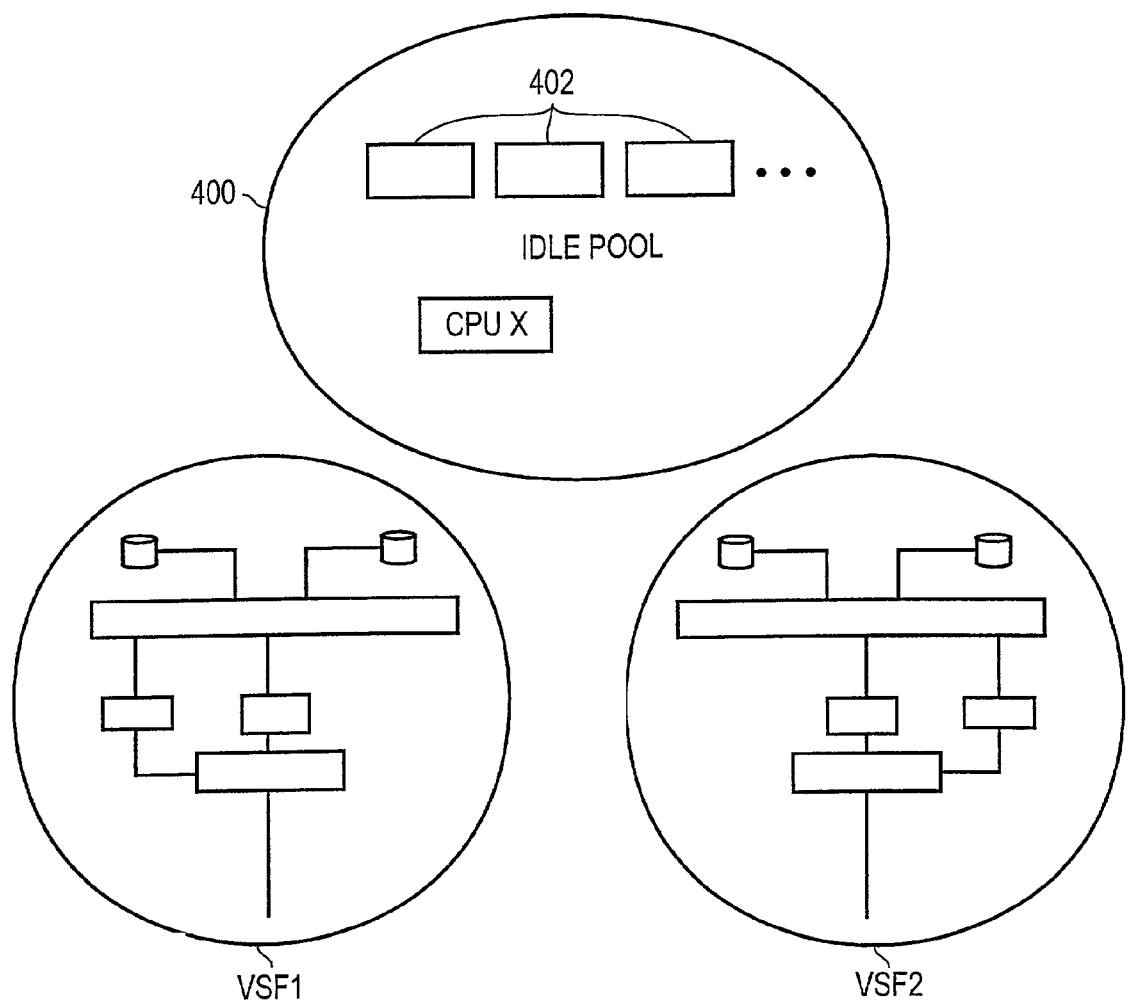
FIG. 4A, FIG. 4B, FIG. 4C, and FIG. 4D are block diagrams showing successive steps involved in adding a computing element and removing element from a virtual server farm.
Figure 4B:
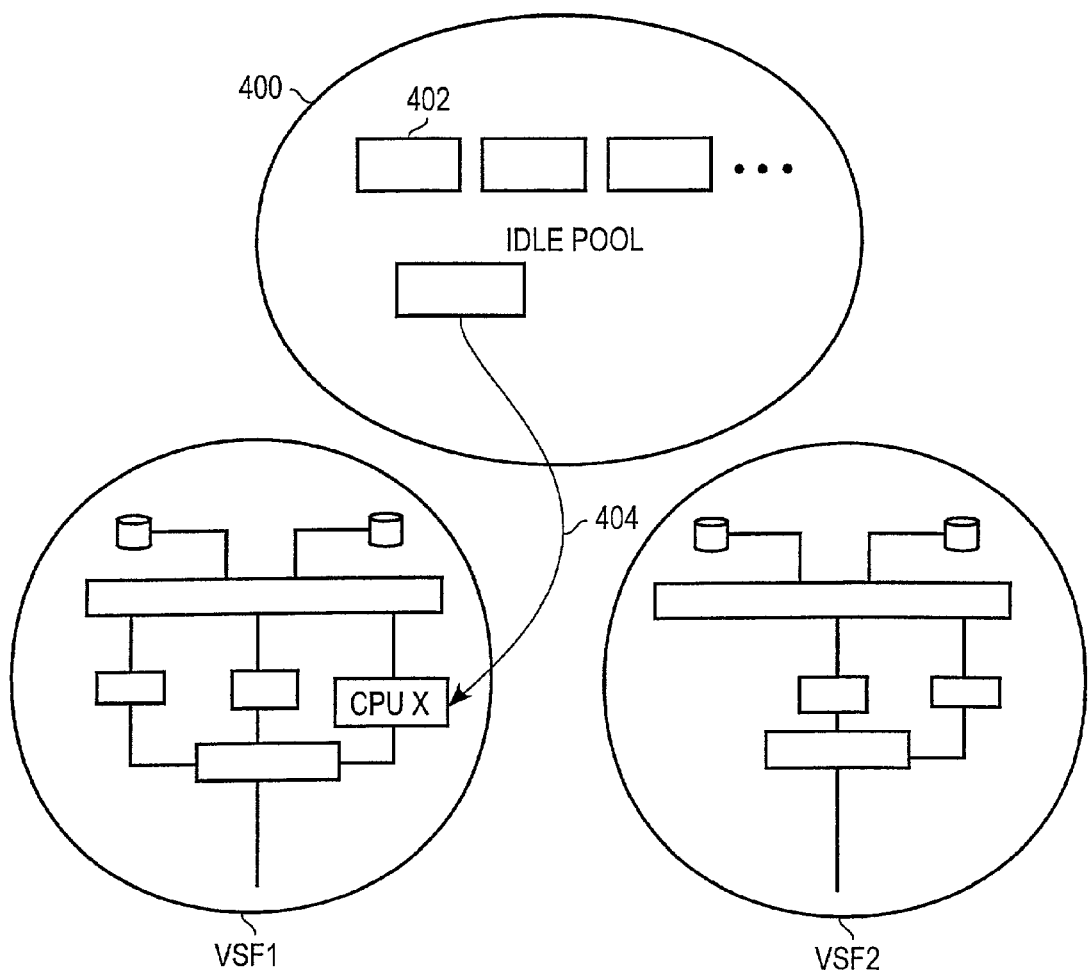

FIG. 4A, FIG. 4B, FIG. 4C, and FIG. 4D are block diagrams showing successive steps involved in moving a computing element in and out of the Idle Pool. Referring first to FIG. 4A, assume that the control plane has logically connected elements of the computing grid into first and second VSFs labeled VSF1, VSF2. Idle Pool 400 comprises a plurality of CPUs 402, one of which is labeled CPUX. In FIG. 4B, VSF1 has developed a need for an additional computing element. Accordingly, the control plane moves CPUX from Idle Pool 400 to VSF1, as indicated by path 404.

Figure 4C:
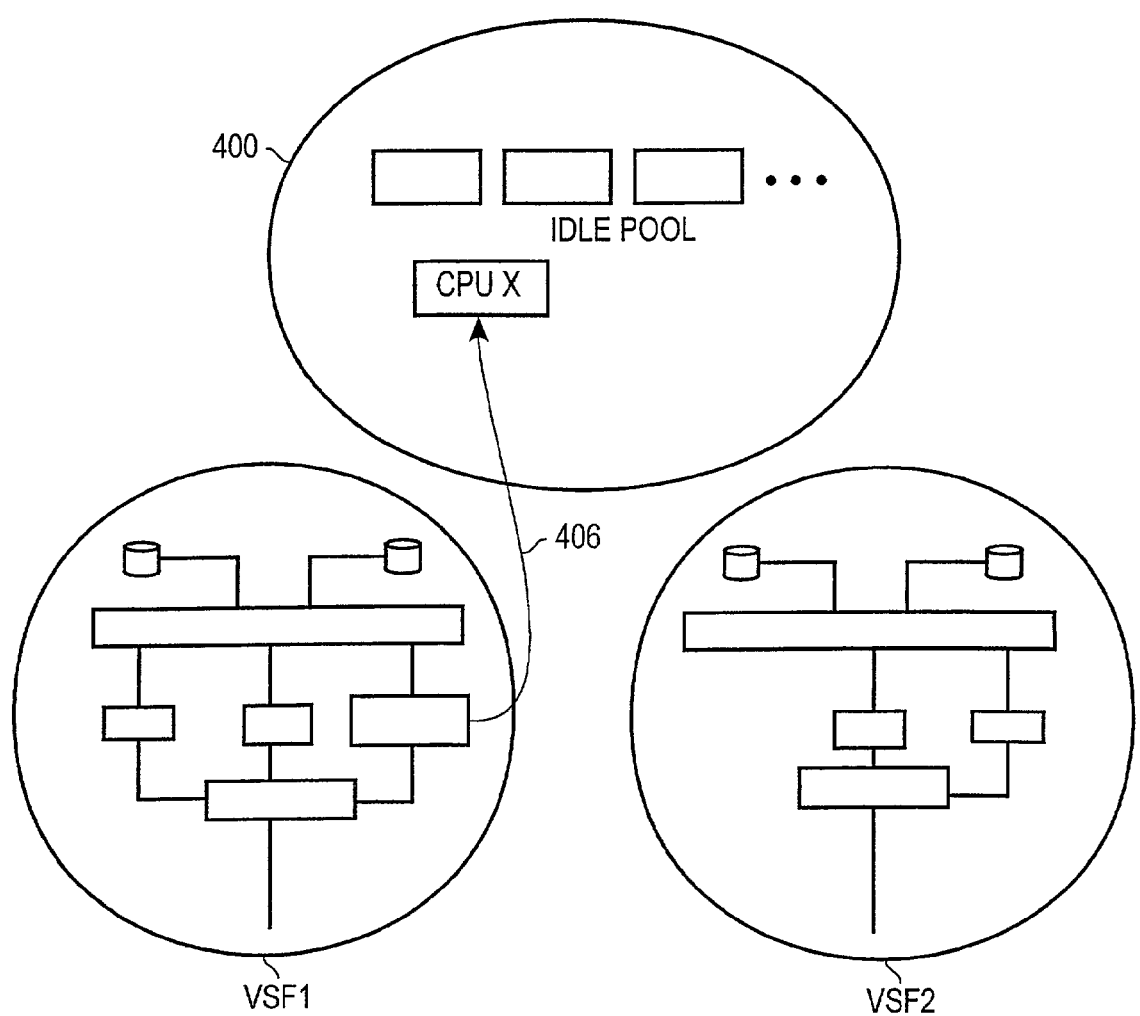
Figure 4D:
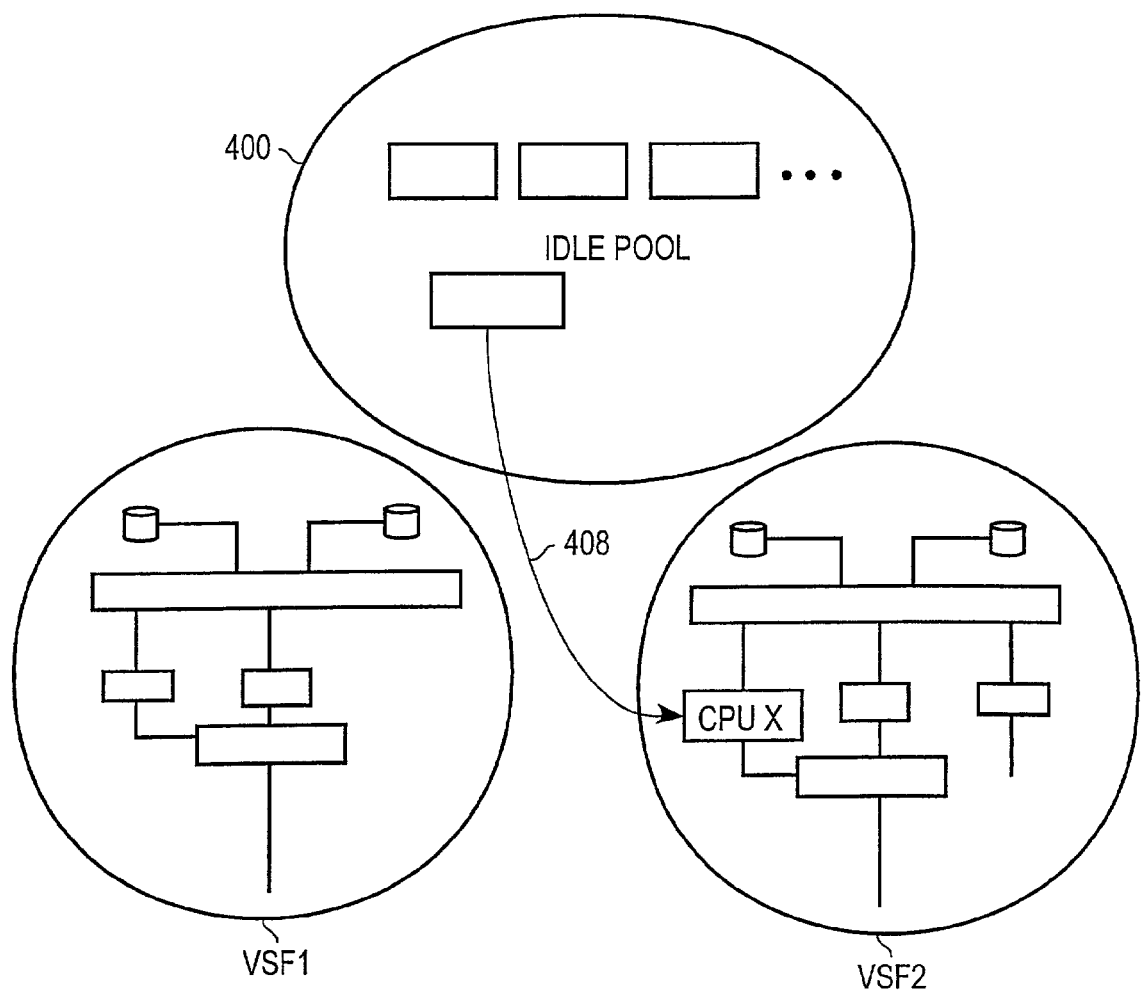

In FIG. 4C, VSF1 no longer needs CPUX, and therefore the control plane moves CPUX out of VSF1 and back into the Idle Pool 400. In FIG. 4D, VSF2 has developed a need for an additional computing element. Accordingly, the control plane moves CPUX from the Idle Pool 400 to VSF2. Thus, over the course of time, as traffic conditions change, a single computing element may belong to the Idle Pool (FIG. 4A), then be assigned to a particular VSF (FIG. 4B), then be placed back in the Idle Pool (FIG. 4C), and then belong to another VSF (FIG. 4D).

At each one of these stages, the control plane configures the LAN switches and SAN switches associated with that computing element to be part of the VLANs and SAN zones associated with a particular VSF (or the Idle Pool). According to one embodiment, in between each transition, the computing element is powered down or rebooted. When the computing element is powered back up, the computing element views a different portion of storage zone on the SAN. In particular, the computing element views a portion of storage zone on the SAN that includes a bootable image of an operating system (e.g., Linux, NT, Solaris, etc.). The storage zone also includes a data portion that is specific to each organization (e.g., files associated with a Web server, database partitions, etc.). The computing element is also part of another VLAN which is part of the VLAN set of another VSF, so it can access CPUs, SAN storage devices and NAS devices associated with the VLANs of the VSF into which it has been transitioned.

In a preferred embodiment, the storage zones include a plurality of pre-defined logical blueprints that are associated with roles that may be assumed by the computing elements.

Initially, no computing element is dedicated to any particular role or task such as Web server, application server, database server, etc. The role of the computing element is acquired from one of a plurality of pre-defined, stored blueprints, each of which defines a boot image for the computing elements that are associated with that role. The blueprints may be stored in the form of a file, a database table, or any other storage format that can associate a boot image location with a role.

Thus, the movements of CPU X in FIG. 4A, FIG. 4B, FIG. 4C, FIG. 4D are logical, not physical, and are accomplished by re-configuring VLAN switches and SAN Zones under control of The control plane. Further, each computing element in the computing grid initially is essentially fungible, and assumes a specific processing role only after it is connected in a virtual server farm and loads software from a boot image. No computing element is dedicated to any particular role or task such as Web server, application server, database server, etc. The role of the computing element is acquired from one of a plurality of pre-defined, stored blueprints, each of which is associated with a role, each of which defines a boot image for the computing elements that are associated with that role.

Since there is no long-lived state information stored in any given computing element (such as a local disk), nodes are easily moved between different VSFs, and can run completely different OS and application software. This also makes each computing element highly replaceable, in case of planned or unplanned downtime.

A particular computing element may perform different roles as it is brought into and out of various VSFs. For example, a computing element may act as a Web server in one VSF, and when it is brought into a different VSF, it may be a database server, a Web load balancer, a Firewall, etc. It may also successively boot and run different operating systems such as Linux, NT or Solaris in different VSFs. Thus, each computing element in the computing grid is fungible, and has no static role assigned to it. Accordingly, the entire reserve capacity of the computing grid can be used to provide any of the services required by any VSF. This provides a high degree of availability and reliability to the services provided by a single VSF, because each server performing a particular service has potentially thousands of back-up servers able to provide the same service.

Further, the large reserve capacity of the computing grid can provide both dynamic load balancing properties, as well as high processor availability. This capability is enabled by the unique combination of diskless computing elements interconnected via VLANs, and connected to a configurable zone of storage devices via a SAN, all controlled in real-time by the control plane. Every computing element can act in the role of any required server in any VSF, and can connect to any logical partition of any disk in the SAN. When the grid requires more computing power or disk capacity, computing elements or disk storage is manually added to the idle pool, which may decrease over time as more organizations are provided VSF services. No manual intervention is required in order to increase the number of CPUs, network and disk bandwidth and storage available to a VSF. All such resources are allocated on demand from CPU, network and disk resources available in the Idle Pool by the control plane.

A particular VSF is not subjected to manual reconfiguration. Only the computing elements in the idle pool are manually configured into the computing grid. As a result, a great potential hazard present in current manually constructed server farms is removed. The possibility that human error in configuring a new server into a live server farm can cause the server farm to malfunction, possibly resulting in loss of service to users of that Web site, is virtually eliminated.

The control plane also replicates data stored in SAN attached storage devices, so that failure of any particular storage element does not cause a loss of service to any part of the system. By decoupling long-lived storage from computing devices using SANs, and by providing redundant storage and computing elements, where any computing element can be attached to any storage partition, a high degree of availability is achieved.

Figure 5A:
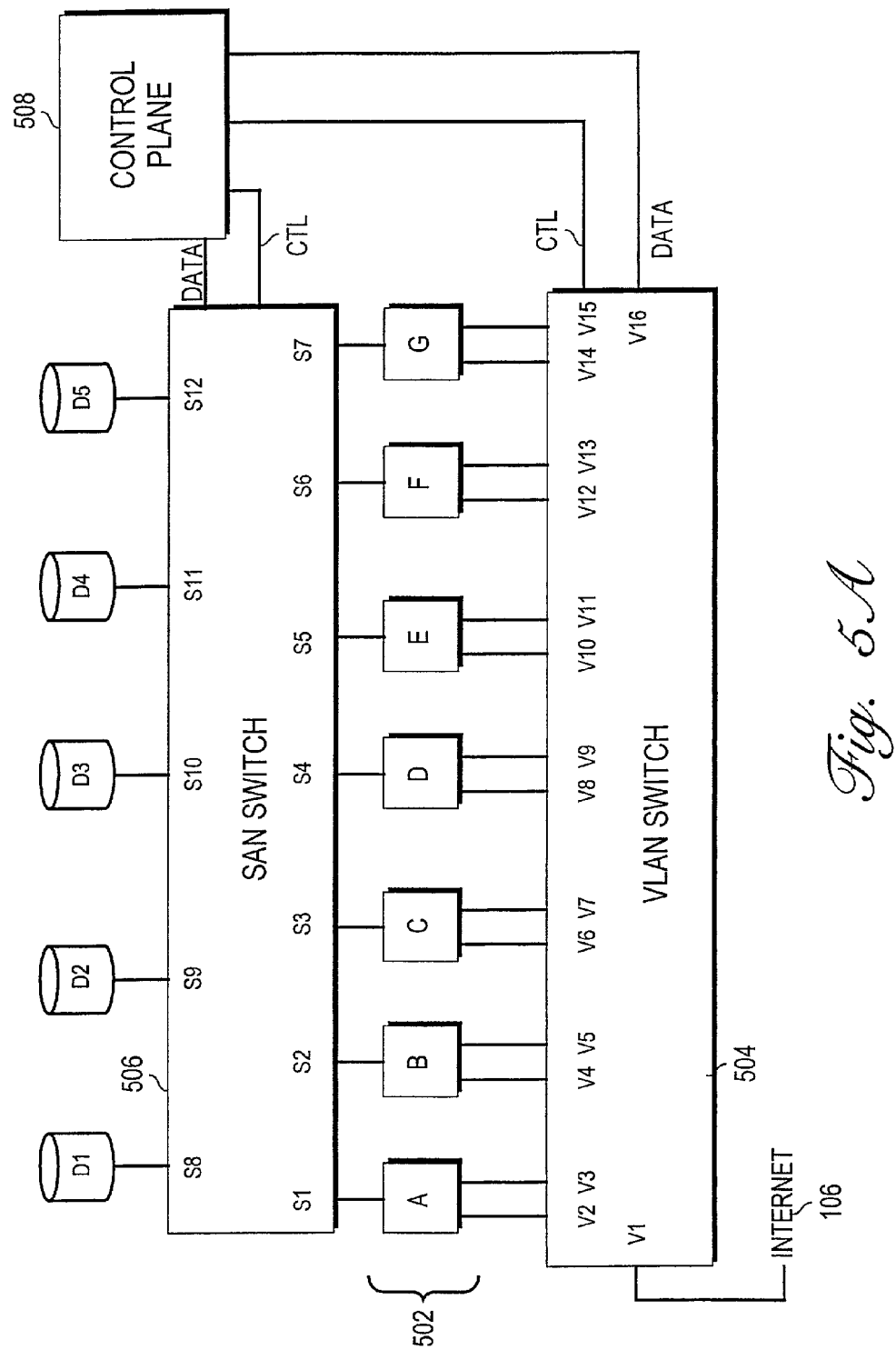
FIG. 5A is a block diagram of a computing grid and control plane mechanism according to an embodiment

A Detailed Example of Establishing a Virtual Server Farm, Adding a Processor to it, and Removing a Processor from it FIG. 5A is a block diagram of a computing grid and control plane mechanism according to an embodiment. With reference to FIG. 5A, the following describes the detailed steps that may be used to create a VSF, add nodes to it and delete nodes from it.

FIG. 5A depicts computing elements 502, comprising computers A through G, coupled to VLAN capable switch 504. VLAN switch 504 is coupled to Internet 106, and the VLAN switch has ports V1, V2, etc. Computers A through G are further coupled to SAN switch 506, which is coupled to a plurality of storage devices or disks D1-D5. The SAN switch 506 has ports S1, S2, etc. A control plane mechanism 508 is communicatively coupled by control paths and data paths to SAN switch 506 and to VLAN switch 504. The control plane is able to send control commands to these devices through the control ports.

For the sake of simplicity and exposition, the number of computing elements in FIG. 5A is a small number. In practice, a large number of computers, e.g., thousands or more, and an equally large number of storage devices form the computing grid. In such larger structures, multiple SAN switches are interconnected to form a mesh, and multiple VLAN switches are interconnected to form a VLAN mesh. For clarity and simplicity, however, FIG. 5A shows a single SAN switch and a single VLAN switch.

Initially, all computers A-G are assigned to the idle pool until the control plane receives a request to create a VSF. All ports of the VLAN switch are assigned to a specific VLAN which we shall label as VLAN I (for the idle zone). Assume that the control plane is asked to construct a VSF, containing one load balancer/firewall and two Web servers connected to a storage device on the SAN. Requests to control plane may arrive through a management interface or other computing element.

In response, the control plane assigns or allocates CPU A as the load balancer/firewall, and allocates CPUs B and C as the Web servers. CPU A is logically placed in SAN Zone 1, and pointed to a bootable partition on a disk that contains dedicated load balancing/firewalling software. The term "pointed to" is used for convenience and is intended to indicate that CPU A is given, by any means, information sufficient to enable CPU A to obtain or locate appropriate software that it needs to operate. Placement of CPU A in SAN Zone 1 enables CPU A to obtain resources from disks that are controlled by the SAN of that SAN Zone.

The load balancer is configured by the control plane to know about CPUs B and C as the two Web servers it is supposed to load balance. The firewall configuration protects CPUs B and C against unauthorized access from the Internet 106. CPUs B and C are pointed to a disk partition on the SAN that contains a bootable OS image for a particular operating system (e.g., Solaris, Linux, NT etc) and Web server application software (e.g., Apache). The VLAN switch is configured to place ports v1 and v2 on VLAN 1, and ports v3, v4, v5, v6 and v7 on VLAN 2. The control plane configures the SAN switch 506 to place Fibre-Channel switch ports s1, s2, s3 and s8 into SAN zone 1.

A description of how a CPU is pointed to a particular disk drive, and what this means for booting up and shared access to disk data, is provided further herein.

Figure 6:
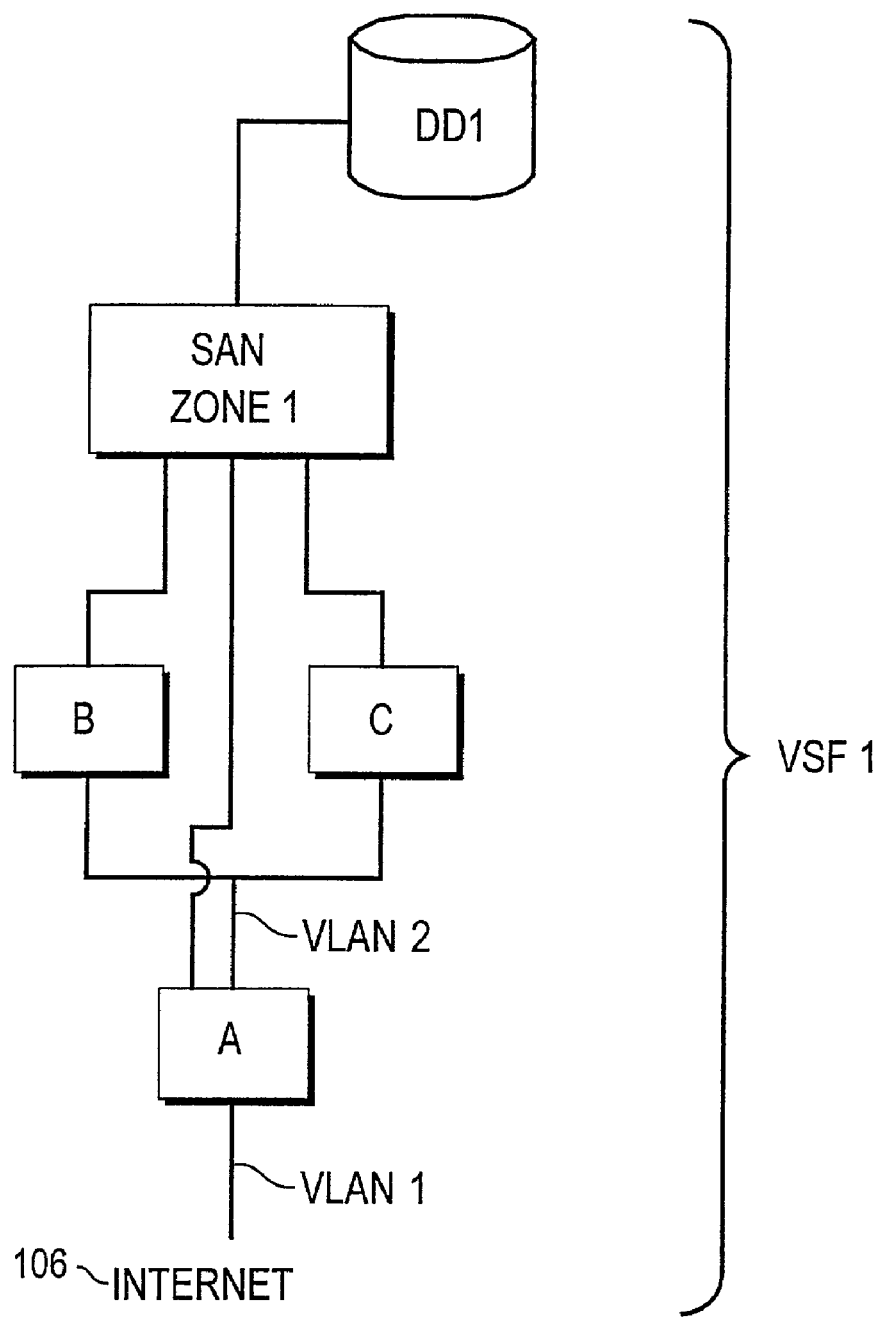
FIG. 6 is a block diagram of logical connections of a virtual server farm.

FIG. 6 is a block diagram of the resulting the logical connectivity of computing elements, which are collectively called VSF 1. Disk drive DD1 is selected from among storage devices D1, D2, etc. Once the logical structure as shown in FIG. 6 is achieved, CPUs A, B, C are given a power-up command. In response, CPU A becomes a dedicated load balancer/firewall-computing element, and CPUs B, C become Web servers.

Now, assume that because of a policy-based rule, the control plane determines that another Web server is required in VSF 1. This may be caused, for example, by an increased number of requests to the Web site and the customer's plan permits at least three Web servers to be added to VSF 1. Or it may be because the organization that owns or operates the VSF wants another server, and has added it through an administrative mechanism, such as a privileged Web page that allows it to add more servers to its VSF.

In response, the control plane decides to add CPU D to VSF 1. In order to do this, the control plane will add CPU D to VLAN 2 by adding ports v8 and v9 to VLAN 2. Also, CPU D's SAN port s4 is added to SAN zone 1. CPU D is pointed to a bootable portion of the SAN storage that boots up and runs as a Web server. CPU D also gets read-only access to the shared data on the SAN, which may consist of Web page contents, executable server scripts, etc. This way it is able to serve Web requests intended for the server farm much as CPUs B and C serve requests. The control plane will also configure the load balancer (CPU A) to include CPU D as part of the server set which is being load balanced.

Figure 7:
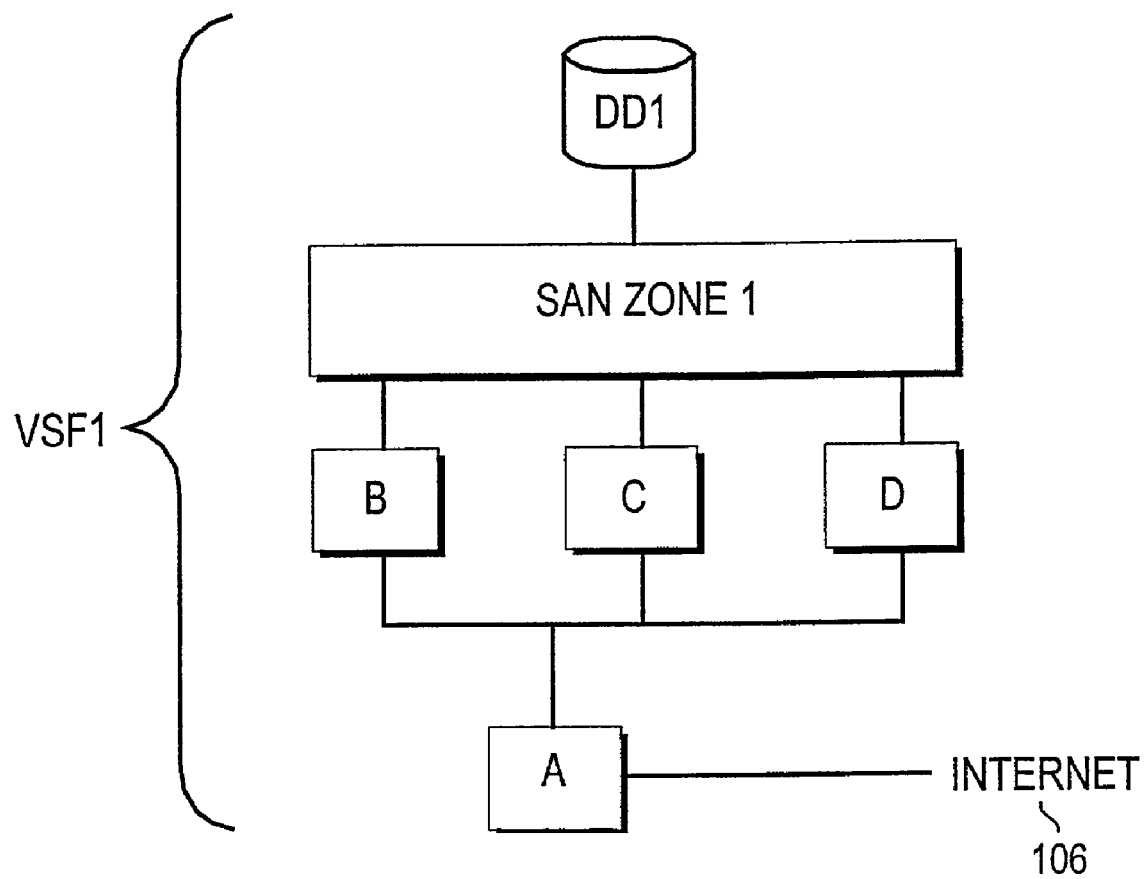
FIG. 7 is a block diagram of logical connections of a virtual server farm.

CPU D is now booted up, and the size of the VSF has now increased to three Web servers and 1 load balancer. FIG. 7 is a block diagram of the resulting logical connectivity.

Assume that the control plane now receives a request to create another VSF, which it will name VSF 2, and which needs two Web servers and one load balancer/firewall. The control plane allocates CPU E to be the load balancer/firewall and CPUs F, G to be the Web servers. It configures CPU E to know about CPUs F, G as the two computing elements to load balance against.

To implement this configuration, the control plane will configure VLAN switch 504 to include port v10, v11 in VLAN 1 (that is, connected to the Internet 106) and ports v12, v13 and v14, v15 to be in VLAN 3. Similarly, it configures SAN switch 506 to include SAN ports s6 and s7 and s9 in SAN zone 2. This SAN zone includes the storage containing the software necessary to run CPU E as a load-balancer and CPUs F and G as Web servers that use a shared read-only disk partition contained in Disk D2 in SAN zone 2.

Figure 8:
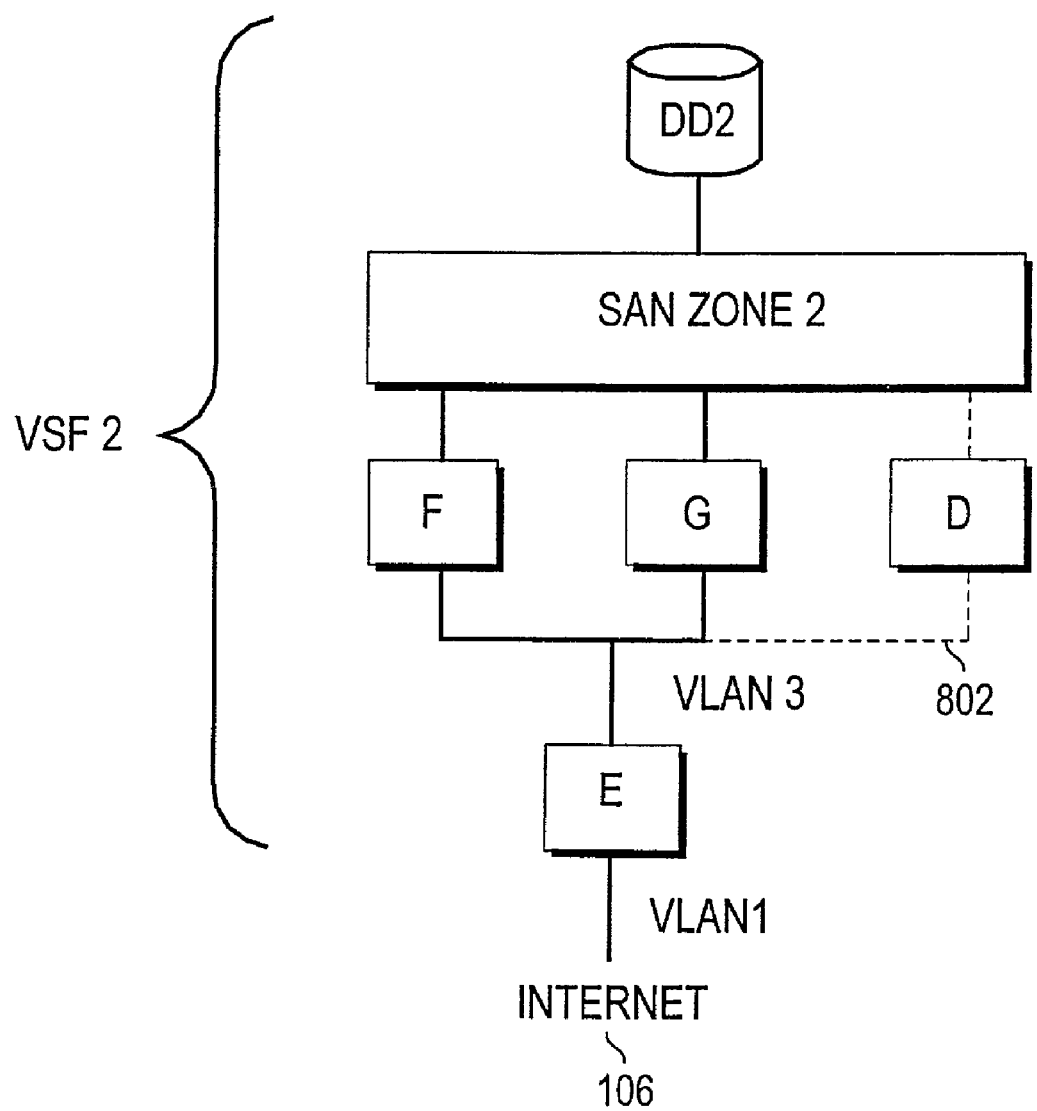
FIG. 8 is a block diagram of logical connections of a virtual server farm.

FIG. 8 is a block diagram of the resulting logical connectivity. Although two VSFs (VSF 1, VSF 2) share the same physical VLAN switch and SAN switch, the two VSFs are logically partitioned. Users who access CPUs B, C, D, or the enterprise that owns or operates VSF 1 can only access the CPUs and storage of VSF 1. Such users cannot access the CPUs or storage of VSF 2. This occurs because of the combination of the separate VLANs and the 2 firewalls on the only shared segment (VLAN 1), and the different SAN zones in which the two VSFs are configured.

Further assume that later, the control plane decides that VSF 1 can now fall back down to two Web servers. This may be because the temporary increase in load on VSF 1 has decreased, or it may be because of some other administrative action taken. In response, the control plane will shut down CPU D by a special command that may include powering down the CPU. Once the CPU has shut down, the control plane removes ports v8 and v9 from VLAN 2, and also removes SAN port s4 from SAN zone 1. Port s4 is placed in an idle SAN zone. The idle SAN zone may be designated, for example, SAN Zone 1 (for Idle) or Zone 0.

Some time later, the control plane may decide to add another node to VSF 2. This may be because the load on the Web servers in VSF 2 has temporarily increased or it may be due to other reasons. Accordingly, the control plane decides to place CPU D in VSF 2, as indicated by dashed path 802. In order to do this, it configures the VLAN switch to include ports v8, v9 in VLAN 3 and SAN port s4 in SAN zone 2. CPU D is pointed to the portion of the storage on disk device 2 that contains a bootable image of the OS and Web server software required for servers in VSF 2. Also, CPU D is granted read-only access to data in a file system shared by the other Web servers in VSF 2. CPU D is powered back up, and it now runs as a load-balanced Web server in VSF 2, and can no longer access any data in SAN zone 1 or the CPUs attached to VLAN 2. In particular, CPU D has no way of accessing any element of VSF 1, even though at an earlier point in time it was part of VSF 1.

Further, in this configuration, the security perimeter enforced by CPU E has dynamically expanded to include CPU D. Thus, embodiments provide dynamic firewalling that automatically adjusts to properly protect computing elements that are added to or removed from a VSF.

For purposes of explanation, embodiments have been described herein in the context of port-based SAN zoning. Other types of SAN zoning may also be used. For example, LUN level SAN zoning may be used to create SAN zones based upon logical volumes within disk arrays. An example product that is suitable for LUN level SAN zoning is the Volume Logics Product from EMC Corporation.

Disk Devices on the SAN

There are several ways by which a CPU can be pointed to a particular device on the SAN, for booting up purposes, or for accessing disk storage which needs to be shared with other nodes, or otherwise provided with information about where to find bootup programs and data.

One way is to provide a SCSI-to-Fibre Channel bridging device attached to a computing element and a SCSI interface for the local disks. By routing that SCSI port to the right drive on the Fibre-Channel SAN, the computer can access the storage device on the Fibre-Channel SAN just as it would access a locally attached SCSI disk. Therefore, software such as boot-up software simply boots off the disk device on the SAN just as it would boot off a locally attached SCSI disk.

Another way is to have a Fibre-Channel interface on the node and associated device-driver and boot ROM and OS software that permits the Fibre-Channel interface to be used as a boot device.

Yet another way is to have an interface card (e.g., PCI bus or Sbus) which appears to be a SCSI or IDE device controller but that in turn communicates over the SAN to access the disk. Operating systems such as Solaris integrally provide diskless boot functions that can be used in this alternative.

Typically there will be two kinds of SAN disk devices associated with a given node. The first is one which is not logically shared with other computing elements, and constitutes what is normally a per-node root partition containing bootable OS images, local configuration files, etc. This is the equivalent of the root file system on a Unix system.

The second kind of disk is shared storage with other nodes. The kind of sharing varies by the OS software running on the CPU and the needs of the nodes accessing the shared storage. If the OS provides a cluster file system that allows read/write access of a shared-disk partition between multiple nodes, the shared disk is mounted as such a cluster file system. Similarly, the system may use database software such as Oracle Parallel Server that permits multiple nodes running in a cluster to have concurrent read/write access to a shared disk. In such cases, a shared disk is already designed into the base OS and application software.

For operating systems where such shared access is not possible, because the OS and associated applications cannot manage a disk device shared with other nodes, the shared disk can be mounted as a read-only device. For many Web applications, having read-only access to Web related files is sufficient. For example, in Unix systems, a particular file system may be mounted as read-only.

Multi-Switch Computing Grid

The configuration described above in connection with FIG. 5A can be expanded to a large number of computing and storage nodes by interconnecting a plurality of VLAN switches to form a large switched VLAN fabric, and by interconnecting multiple SAN switches to form a large switched SAN mesh. In this case, a computing grid has the architecture generally shown in FIG. 5A, except that the SAN/VLAN switched mesh contains a very large number of ports for CPUs and storage devices. A number of computing elements running the control plane can be physically connected to the control ports of the VLAN/SAN switches, as described further below. Interconnection of multiple VLAN switches to create complex multi-campus data networks is known in this field. See, for example, G. Haviland, "Designing High-Performance Campus Intranets with Multilayer Switching," Cisco Systems, Inc., and information available from Brocade.

SAN Architecture

The description assumes that the SAN comprises Fibre-Channel switches and disk devices, and potentially Fibre-Channel edge devices such as SCSI-to-Fibre Channel bridges. However, SANs may be constructed using alternative technologies, such as Gigabit Ethernet switches, or switches that use other physical layer protocols. In particular, there are efforts currently underway to construct SANs over IP networks by running the SCSI protocol over IP. The methods and architecture described above is adaptable to these alternative methods of constructing a SAN. When a SAN is constructed by running a protocol like SCSI over IP over a VLAN capable layer 2 environment, then SAN zones are created by mapping them to different VLANs.

Also, Network Attached Storage (NAS) may be used, which works over LAN technologies such as fast Ethernet or Gigabit Ethernet. With this option, different VLANs are used in place of the SAN zones in order to enforce security and the logical partitioning of the computing grid. Such NAS devices typically support network file systems such as Sun's NSF protocol, or Microsoft's SMB, to allow multiple nodes to share the same storage.

Control Plane Implementation

In the descriptions above, the Control Plane is represented as a box coupled to control and data ports of the SAN/VLAN switches. However, other implementations of Control Plane are contemplated.

Figure 9:
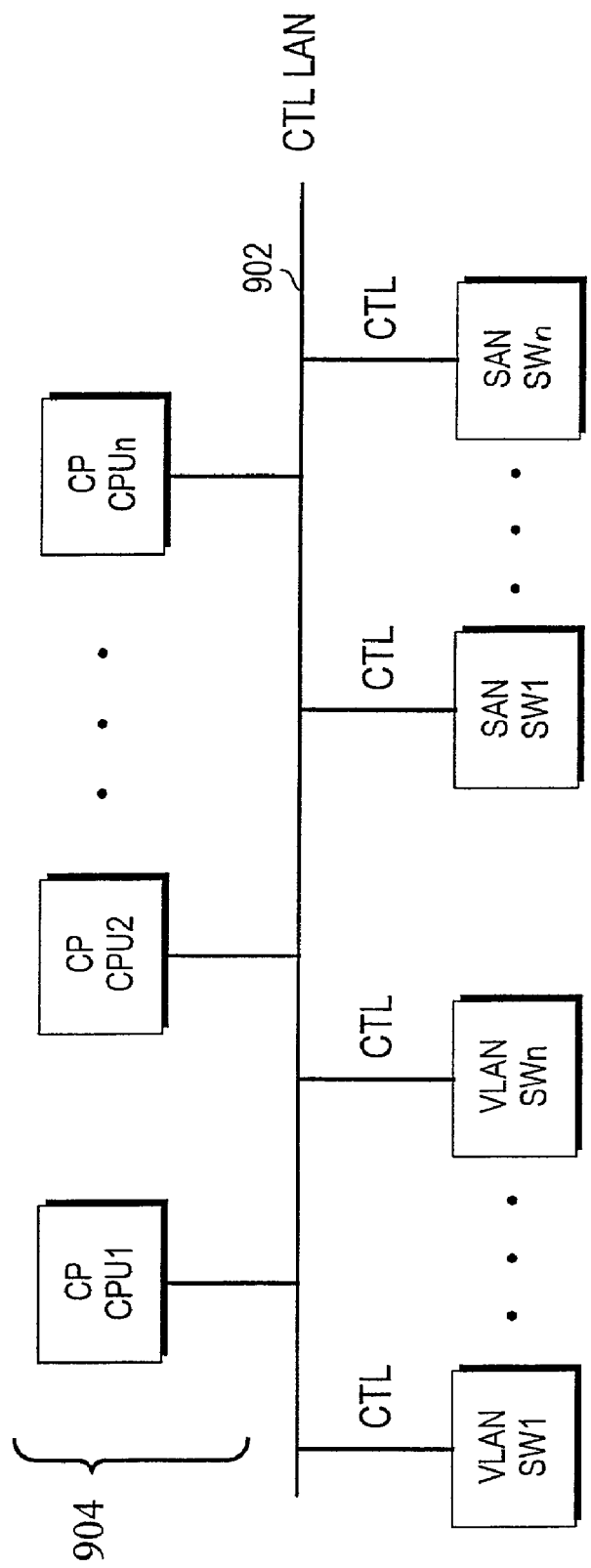
FIG. 9 is a block diagram of a logical relationship between a control plane and a data plane.

Typically the SAN/VLAN control ports are Ethernet interfaces. FIG. 9 is a block diagram of an architecture that can be used in such a case. All the control ("CTL") ports of each VLAN switch (VLAN SW1, VLAN SWn) and all the control ports of each SAN switch (SAN SW1, SAN SWn) are placed on a single Ethernet subnet 902. The subnet 902 is connected only to a plurality of Control Plane machines CP CPU1, CP CPU2, etc. This permits multiple Control Plane machines to be connected to the control ports of all the SAN switches and VLAN switches.

In this configuration, the plurality of Control Plane machines are referred to collectively as the Control Plane or CP 904. Only machines in CP 904 have a physical connection to the control ports of the VLAN switches and SAN switches. Accordingly, CPUs in a given VSF cannot change the membership of the VLANs and SAN zones associated with its own VSF or any other VSF.

Alternatively, instead of Ethernet interfaces, the control ports could be serial or parallel ports. In this case, the ports are coupled to the Control Plane machines.

Control Plane Data Connections to VLANS

The machines running the Control Plane need to have access to the data ports on both the VLAN switches as well as the SAN switches. This is required in order for the Control Plane to be able to configure the files related to a particular node and to collect real-time information from a node related to current CPU load, network load, and disk load.

Figure 5B:
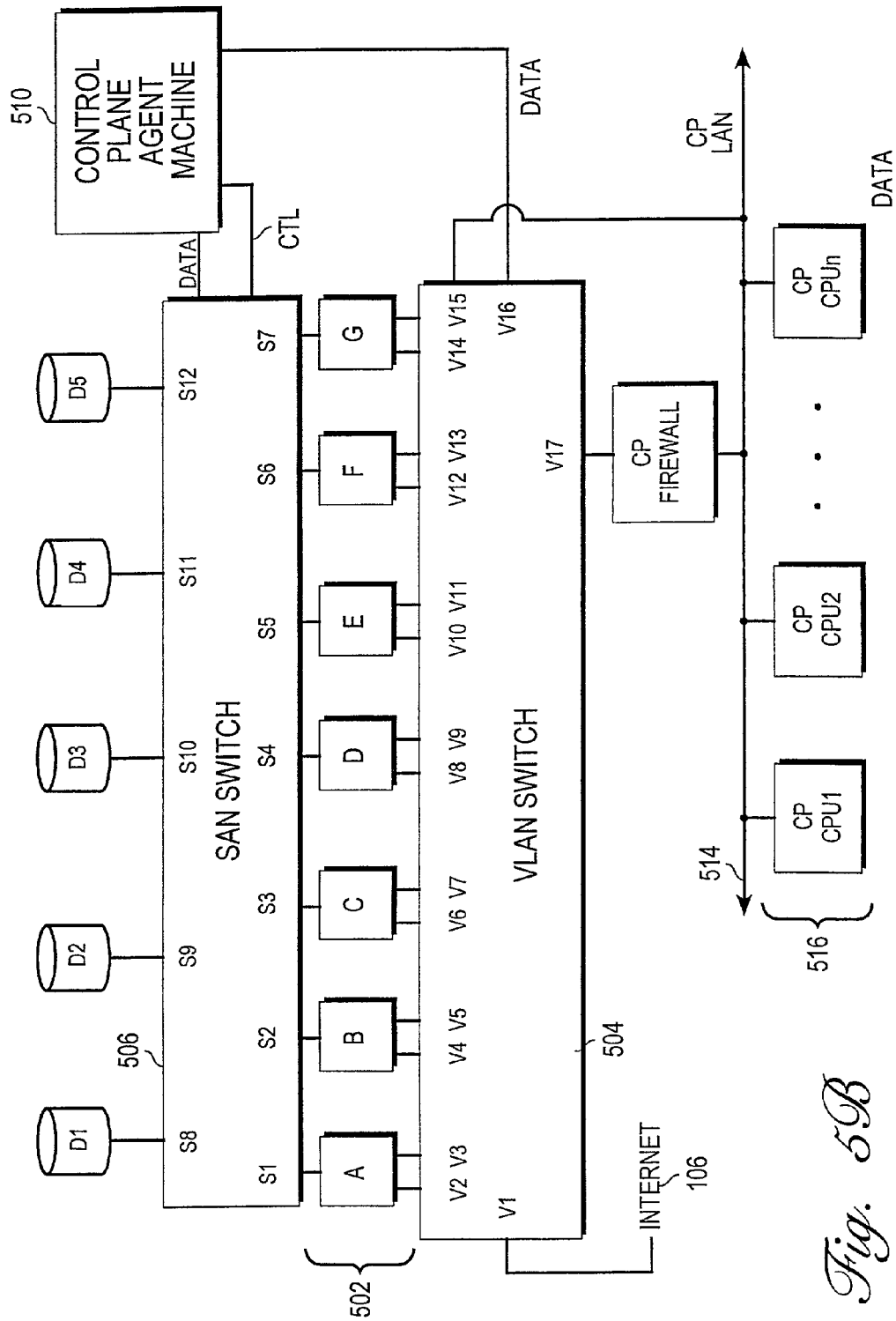
FIG. 5B is a block diagram of one embodiment showing a configuration for connecting a Control Plane to data ports.

FIG. 5B is a block diagram of one embodiment showing a configuration for connecting a Control Plane 516 to data ports. In one embodiment, machines in each VSF periodically send a packet to a machine 510 that is acting as an agent for the Control Plane. Alternatively, the Control Plane agent machine 510 can periodically poll the nodes in the VSF for their real-time data. The Control Plane agent machine 510 then sends the data it collects from all the nodes in a VSF to the CP 516. Each machine in CP 516 is coupled to a CP LAN 514. The CP LAN 514 is coupled to a special port V17 of VLAN Switch 504 through a CP firewall 512. This provides a scalable and secure means for the CP to collect all the real-time information from the nodes in all the VSFs.

Control Plane to SAN Data Connections

Figure 10:
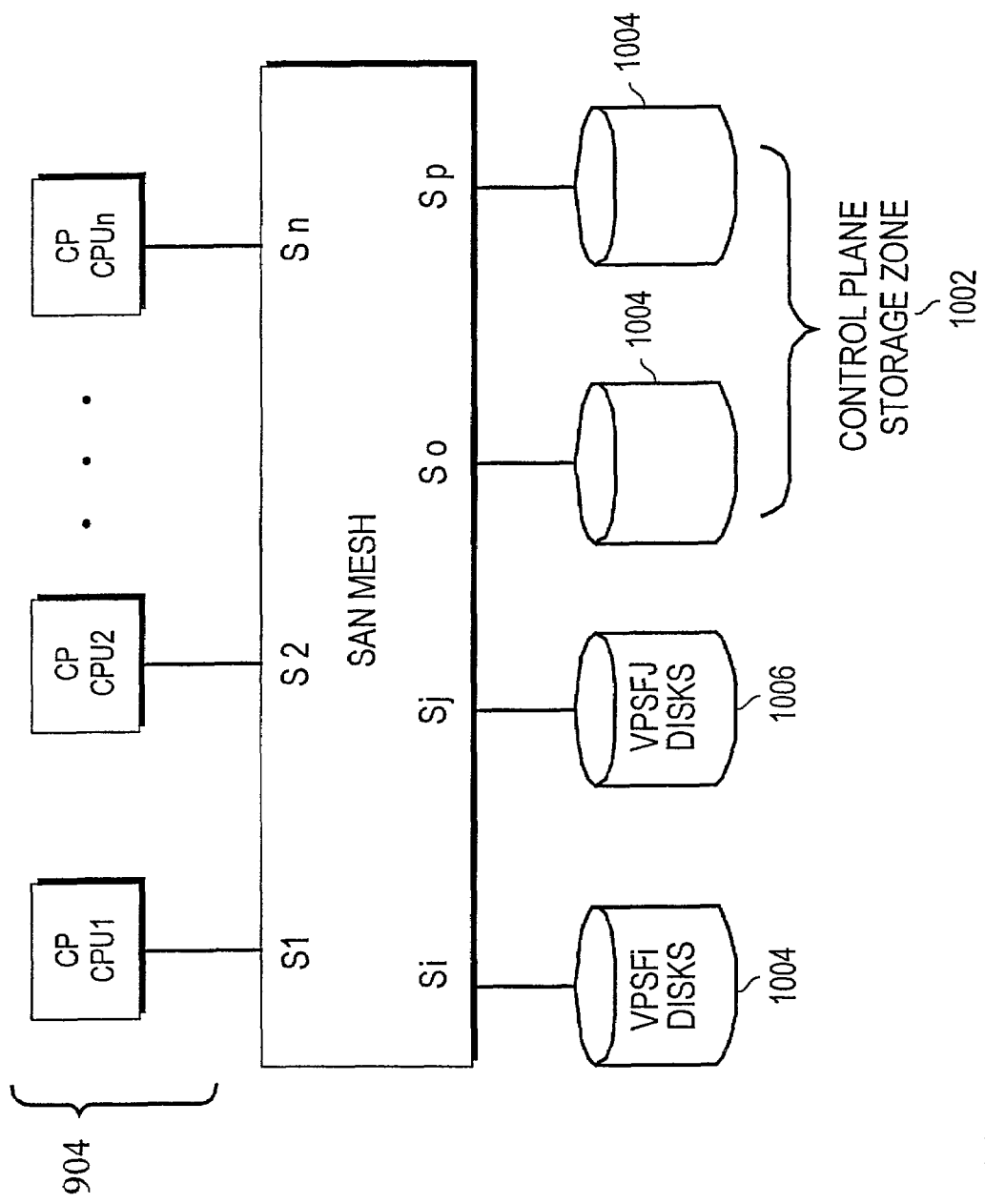
FIG. 10 is a block diagram showing connections of Control Plane machines to an embodiment that uses a plurality of SAN switches ("SAN mesh").

FIG. 10 is a block diagram showing connections of Control Plane machines to an embodiment that uses a plurality of SAN switches ("SAN mesh"). A plurality of Control Plane machines CP CPU1, CP CPU2, etc., form a Control Plane Server Farm (CP) 904. Each Control Plane machine is coupled to a port of the SAN mesh.

Associated with the Control Plane machines is a set of SAN ports So, Sp that are connected to disks 1004 that contain data private to the Control Plane. Disks 1004 are logically located in Control Plane Private Storage Zone 1002, which is an area where the Control Plane maintains log files, statistical data, current Control Plane configuration information, and software that implements the Control Plane. SAN ports So, Sp are only part of the Control Plane SAN zone. Ports So, Sp are never placed on any other SAN zone, and only machines which are part of the CP 904 can access the disks 1004 connected to these ports.

Ports S1, S2 and Sn and ports So and Sp are in the Control Plane SAN zone. No computing element from either the Idle Pool or any VSF is part of the Control Plane SAN zone. This ensures that Control Plane private data is protected from access from any VSF.

When a particular Control Plane machine needs to access a disk partition which is part of a particular VSF, such as VSF I of FIG. 10, then it is placed in the SAN zone associated with that VSF. In this example, CP CPU 2 needs to access the disks of VSF I, so port s2 which is associated with CP CPU 2 is placed in the SAN zone of VSF I, which includes port si. Once the CP CPU is done accessing the disks on port si, it is removed from the SAN zone of VSF I.

Similarly, if a machine such as CP CPU 1 needs to access the disks of VSF j, then it is placed in the SAN zone associated with VSF j. As a result, port s2 is placed in the SAN zone associated with VSF j, which includes the zone containing port sj. Once CP 1 is done accessing the disks connected to port sj, it is removed from the SAN zone associated with VSF j.

Control Plane to VLAN Data Connections

Control Plane machines need to collect information from the computing nodes, such as real-time load related information. In order to do this Control Plane needs to have network connectivity to the nodes in the grid itself.

A Wide Area Computing Grid

The VSF described above can be distributed over a WAN in several ways. In one alternative, a wide area backbone may be based on Asynchronous Transfer Mode (ATM) switching. In this case, each local area VLAN is extended into a wide area using Emulated LANs (ELANs) which are part of the ATM LAN Emulation (LANE) standard. In this way, a single VSF can span across several wide area links, such as ATM/SONET/OC-12 links. An ELAN becomes part of a VLAN which extends across the ATM WAN.

Alternatively, a VSF is extended across a WAN using a VPN system. In this embodiment, the underlying characteristics of the network become irrelevant, and the VPN is used to interconnect two or more VSFs across the WAN to make a single distributed VSF.

Data mirroring technologies can be used in order to have local copies of the data in a distributed VSF. Alternatively, the SAN is bridged over the WAN using one of several SAN to WAN bridging techniques, such as SAN-to-ATM bridging or SAN-to-Gigabit Ethernet bridging. SANs constructed over IP networks naturally extend over the WAN since IP works well over such networks.

Figure 11:
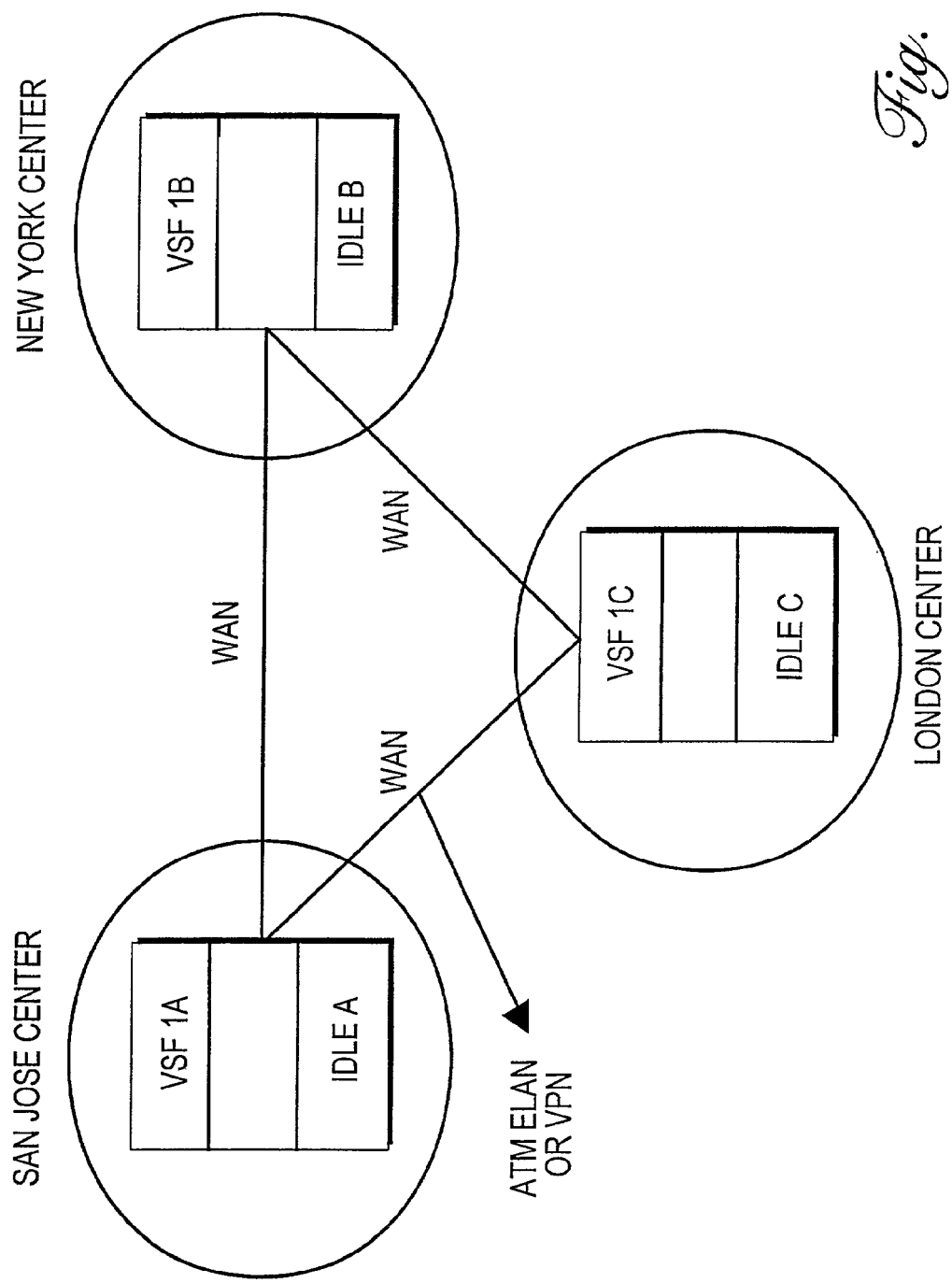
FIG. 11 is a block diagram of a plurality of VSFs extended over WAN connections.

FIG. 11 is a block diagram of a plurality of VSFs extended over WAN connections. A San Jose Center, New York Center, and London center are coupled by WAN connections. Each WAN connection comprises an ATM, ELAN, or VPN connection in the manner described above. Each center comprises at least one VSF and at least one Idle Pool. For example, the San Jose center has VSF1A and Idle Pool A. In this configuration, the computing resources of each Idle Pool of a center are available for allocation or assignment to a VSF located in any other center. When such allocation or assignment is carried out, a VSF becomes extended over the WAN.

Example Uses of VSFS

The VSF architecture described in the examples above may be used in the context of Web server system. Thus, the foregoing examples have been described in terms of Web servers, application servers and database servers constructed out of the CPUs in a particular VSF. However, the VSF architecture may be used in many other computing contexts and to provide other kinds of services; it is not limited to Web server systems.

A Distributed VSF as Part of a Content Distribution Network

In one embodiment, a VSF provides a Content Distribution Network (CDN) using a wide area VSF. The CDN is a network of caching servers that performs distributed caching of data. The network of caching servers may be implemented, for example, using TrafficServer (TS) software commercially available from Inktomi Corporation, San Mateo, Calif. TS is a cluster aware system; the system scales as more CPUs are added to a set of caching Traffic Server computing elements. Accordingly, it is well suited to a system in which adding CPUs is the mechanism for scaling upwards.

In this configuration, a system can dynamically add more CPUs to that portion of a VSF that runs caching software such as TS, thereby growing the cache capacity at a point close to where bursty Web traffic is occurring. As a result, a CDN may be constructed that dynamically scales in CPU and I/O bandwidth in an adaptive way.

A VSF for Hosted Intranet Applications

There is growing interest in offering Intranet applications such as Enterprise Resource Planning (ERP), ORM and CRM software as hosted and managed services. Technologies such as Citrix WinFrame and Citrix MetaFrame allow an enterprise to provide Microsoft Windows applications as a service on a thin client such as a Windows CE device or Web browser. A VSF can host such applications in a scalable manner.

For example, the SAP R/3 ERP software, commercially available from SAP Aktiengesellschaft of Germany, allows an enterprise to load balance using multiple Application and Database Servers. In the case of a VSF, an enterprise would dynamically add more Application Servers (e.g., SAP Dialog Servers) to a VSF in order to scale up the VSF based on real-time demand or other factors.

Similarly, Citrix Metaframe allows an enterprise to scale up Windows application users on a server farm running the hosted Windows applications by adding more Citrix servers. In this case, for a VSF, the Citrix MetaFrame VSF would dynamically add more Citrix servers in order to accommodate more users of Metaframe hosted Windows applications. It will be apparent that many other applications may be hosted in a manner similar to the illustrative examples described above.

Customer Interaction with a VSF

Since a VSF is created on demand, a VSF customer or organization that "owns" the VSF may interact with the system in various ways in order to customize a VSF. For example, because a VSF is created and modified instantly via the control plane, the VSF customer may be granted privileged access to create and modify its VSF itself. The privileged access may be provided using password authentication provided by Web pages and security applications, token card authentication, Kerberos exchange, or other appropriate security elements.

In one exemplary embodiment, a set of Web pages are served by the computing element, or by a separate server. The Web pages enable a customer to create a custom VSF, by specifying a number of tiers, the number of computing elements in a particular tier, the hardware and software platform used for each element, and things such as what kind of Web server, application server, or database server software should be pre-configured on these computing elements. Thus, the customer is provided with a virtual provisioning console.

After the customer or user enters such provisioning information, the control plane parses and evaluates the order and queues it for execution. Orders may be reviewed by human managers to ensure that they are appropriate. Credit checks of the enterprise may be run to ensure that it has appropriate credit to pay for the requested services. If the provisioning order is approved, the control plane may configure a VSF that matches the order, and return to the customer a password providing root access to one or more of the computing elements in the VSF. The customer may then upload master copies of applications to execute in the VSF.

When the enterprise that hosts the computing grid is a for-profit enterprise, the Web pages may also receive payment related information, such as a credit card, a PO number, electronic check, or other payment method.

In another embodiment, the Web pages enable the customer to choose one of several VSF service plans, such as automatic growth and shrinkage of a VSF between a minimum and maximum number of elements, based on real-time load. The customer may have a control value that allows the customer to change parameters such as minimum number of computing elements in a particular tier such as Web servers, or a time period in which the VSF must have a minimal amount of server capacity. The parameters may be linked to billing software that would automatically adjust the customer's bill rate and generate billing log file entries.

Through the privileged access mechanism the customer can obtain reports and monitor real-time information related to usage, load, hits or transactions per second, and adjust the characteristics of a VSF based on the real-time information. It will be apparent that the foregoing features offer significant advantages over conventional manual approaches to constructing a server farm. In the conventional approaches, a user cannot automatically influence server farm's properties without going through a cumbersome manual procedure of adding servers and configuring the server farm in various ways.

Billing Models for Resources and VSFs

Given the dynamic nature of a VSF, the enterprise that hosts the computing grid and VSFs may bill service fees to customers who use VSFs using a billing model that is based on actual usage of the computing elements and storage elements of a VSF. It is not necessary to use a flat fee billing model. The VSF architecture and methods disclosed herein enable a "pay-as-you-go" billing model because the resources of a given VSF are not statically assigned. Accordingly, a particular customer having a highly variable usage load on its server farm could save money because it would not be billed a rate associated with constant peak server capacity, but rather, a rate that reflects a running average of usage, instantaneous usage, etc.

For example, an enterprise may operate using a billing model that stipulates a flat fee for a minimum number of computing elements, such as ten servers, and stipulates that when real-time load requires more than ten elements, then the user is billed at an incremental rate for the extra servers, based on how many extra servers were needed and for the length of time that they are needed. The units of such bills may reflect the resources that are used. For example, bills may be expressed in units such as MIPS-hours, CPU-hours, thousands of CPU seconds, etc.

A novel approach is provided for determining an amount to be billed to a customer for the use of resources. According to the approach, the amount to be billed to the customer is determined based upon usage data and value data. The usage data indicates usage, by the customer, of a set of one or more resources during a specified period of time. The value data indicates generally value provided by each resource, from the set of one or more resources, used during the specified period of time. Additional details of the approach are provided hereinafter.

Figure 12:
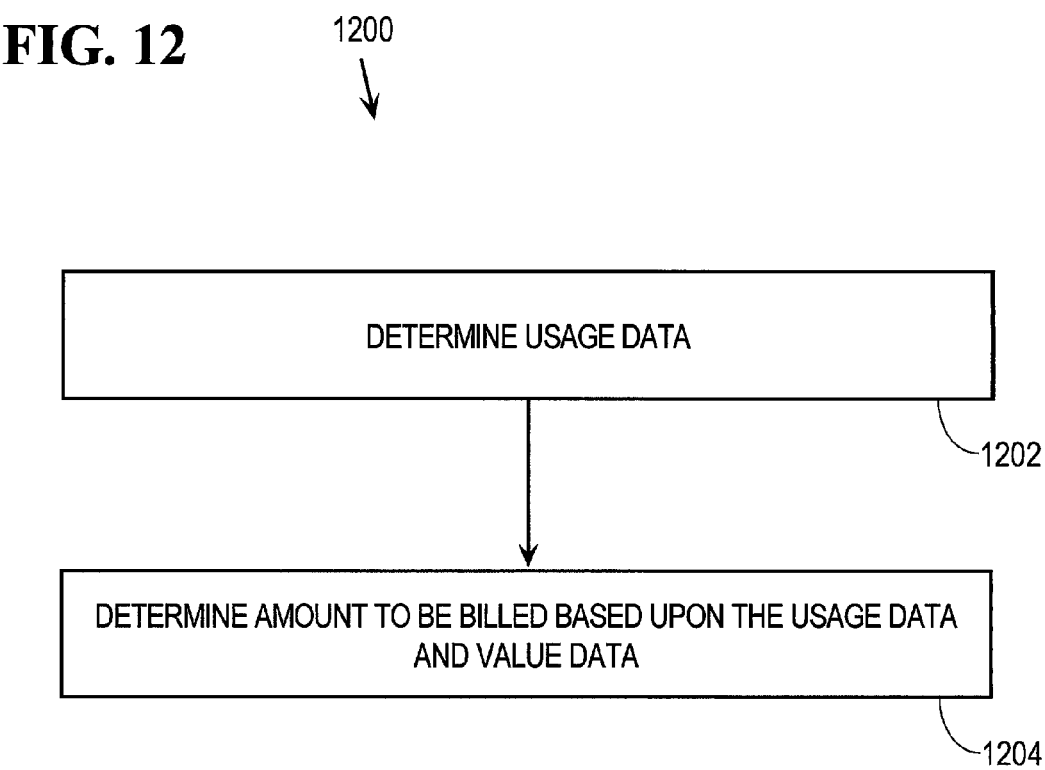
FIG. 12 is a flow diagram depicting an approach for determining an amount to bill a customer for the use of resources.

FIG. 12 is a flow diagram 1200 that illustrates an approach for determining an amount to be billed to a customer for the use of resources during a specified period of time according to an embodiment of the invention. In step 1202, usage data is determined that indicates usage, by a customer, of a set of one or more resources during a specified period of time. The one or more resources may be dynamically selected and de-selected from a plurality of resources at any time, e.g., before, during or after the specified period of time. For example, the one or more resources may be dynamically allocated to the customer from a plurality or "pool" of available resources. The invention is applicable to any type of resources, for example, computing resources, storage resources, networking or interworking resources, in any type of resource arrangement or environment.

In step 1204 an amount to be billed is determined based upon the usage data and value data. The value data indicates generally value provided by each resource from the set of one or more resources used by the customer during the specified period of time. According to one embodiment of the invention, value is expressed in terms of a delivery rate. Delivery rates may be specific to each particular resource used by the customer. Also, delivery rates may vary over time depending upon the requirements of a particular application. Compared to conventional approaches that bill customers for a set of dedicated resources, irrespective of how much those resources are actually used, this approach allows customers to be billed for the resources actually used by the customer during a specified period of time.

1. Service Units

According to one embodiment of the invention, the amount billed to customers for the use of resources is based upon "service units." As used herein, the term "service unit" refers to a unit of measure that indicates value provided by a resource. Service units (SUs) are resource independent. Each resource has an associated delivery rate that is expressed in service units per unit time. For example, a resource may have an assigned delivery rate of 12 SUs per hour. For purposes of explanation only, delivery rates are expressed herein in service units per hour. Other units of time may be used depending upon the requirements of a particular application. Consider the example of resource A, having an assigned delivery rate of 12 SUs per hour, and resource B, having an assigned delivery rate of 20 SUs per hour. The relatively higher delivery rate of resource B indicates generally that resource B provides relatively more value per unit time than resource A. As is described in more detail hereinafter, customers are billed more for the use of resources with higher delivery rates per unit of time. Accordingly, a customer would be charged more per hour for the use of resource B than resource A.

2. Billing Schemes

A variety of billing schemes may be used with the current approach depending upon the requirements of a particular application. Example billing schemes described herein include basic billing, flex billing, event flex billing and open flex billing, that are each described in more detail hereinafter. The basic billing, flex billing, event flex billing and open flex billing schemes are provided as representative schemes and the invention is not limited to these particular schemes. Hence, a variety of other billing schemes may be used depending upon the requirements of a particular application.

a) Basic Billing

According to the basic billing scheme, a customer is allocated a baseline resource configuration and is charged for the use of the baseline resource configuration during a specified period of time. The resources in the baseline resource configuration may change over time, depending upon the requirements of the customer. For example, a baseline resource configuration may include one or more VSFs that are dynamically configured (and reconfigured) as described herein.

According to one embodiment of the invention, two general steps are performed to determine an amount to bill a customer under the basic billing scheme. First, the total number of SU hours used by the customer during the specified period of time is determined based upon the delivery rate for each resource in the baseline resource configuration and the number of hours in the specified period of time. Second, the total number of SUs is then multiplied by the charge per SU.

Consider the following example. Suppose that the baseline resource configuration for a particular customer includes five servers, each server having a delivery rate of ten SUs per hour. For a thirty-day period (720 hours), the particular customer uses (5×10 SUs/Hr×720 Hrs), or 36000 SUs. At a rate of $0.15 per SU, the total amount charged to the particular customer for the use of the five servers during the thirty-day period of time is (36000 SUs×$0.15/SU) or $5400.

According to another embodiment of the invention, the charge for each resource in the baseline resource configuration is first determined separately. Then the total amount charged is determined by summing the charge for each resource. In the prior example, for each server, the number of SUs used by the customer during the thirty-day period (720 hours) of time is (10 SUs/Hr×720 Hrs) or 7200 SUs. Thus, the charge for each resource during the specified period of time is 7200 SUs×$0.15 per SU, or $1080. The total charge is the sum of the charges for each resource or $1080+$1080+$1080+$1080+$1080=$5400.

The basic billing scheme (and all other billing schemes described herein) is applicable to any type of resources and any mix of different resource types, since SUs are resource independent. Table I illustrates the resources contained in an example baseline resource configuration leased by a particular customer.

TABLE I

| RESOURCE TYPE | RESOURCE ID | QUAN-TITY | SUs/HOUR | TOTAL SUs/HOUR |
|---|---|---|---|---|
| Firewall | F-A | 1 | 12 | 12 |
| Load Balancer | LB-A | 2 | 10 | 20 |
| Media Server | MS-C | 1 | 41 | 41 |
| Web Server | WS-B | 10 | 15 | 150 |
| Image Server | IS-X | 1 | 15 | 15 |
| Database Server | DBS-351 | 3 | 59 | 177 |
| Total | | | | 415 |

As depicted in Table I, the particular customer has leased a baseline resource configuration that includes six different types of resources. These include one firewall, two load balancers, one media server, ten web servers, one image server and three database servers. In this example, assuming all of the resources are used, the total number of SUs used or "consumed" per hour by the particular customer is (12+20+41+150+15+177)=415 SUs per hour. Thus, if all of the resources are used for a thirty-day period (720 hours) at a cost of $0.15 per SU, the total cost to the particular customer is (415 SUs/Hr×720 Hrs×$0.15/SU)=$44,820. The particular resources used by the customer may vary over time depending upon the requirements of the particular customer. For example, if the particular customer requires additional Web servers, then Web Servers can be added to the baseline resource configuration. The provider may restrict the customer from reducing resources below those contracted for as part of their baseline resource configuration.

b) Flex Billing

In certain situations, customers may require more resources than are available in their baseline resource configuration. In such cases, customers may want to increase the size of the baseline resource configuration, or they may want to gain access temporarily to additional resources. Additional resources may be required, for example, in situations where peak demand spikes for a short period of time.

According to one embodiment of the invention, a flex billing scheme is used to determine an amount to bill a customer in situations where additional resources are used during a specified period of time. According to the flex billing scheme, customers may be charged for the additional resources at the same rate, i.e., cost per SU, as resources in the baseline resource configuration, or be charged for the additional resources at a premium rate. For example, referring to the prior example in Table I, suppose that the particular customer uses a second F-A firewall during one day for 10 hours over the course of the 30 day billing period. Assuming the customer was charged $0.15/SU for baseline resources and $0.17/SU for the additional resources, i.e., the "flex resources," the customer is charged as follows:

Baseline Resources: (415 SU/Hr×720 HRs×$0.15/SU) =$44,820.00

Flex Resources: (12 SU/Hrs×10 Hrs×$0.17/SU)=$20.40

Total Charges: $44,840.40

The amount charged per SU for flex resources may be a flat rate or may increase as the rate of SU consumption or the total quantity of SUs for flex resources consumed increases. According to one embodiment of the invention, the charge per SU increases in "bands" based upon total usage over the baseline resource configuration for a particular billing period. For example, SUs consumed in the 100-120% range of the baseline configuration may be charged at $0.17 per SU, while SUs consumed in the 121-140% range are charged at $0.20 per SU. For the example baseline resource configuration depicted in Table I, the baseline usage for a 30 day billing period is (415 SUs/Hr×720 hours)=298,800 SUs. Thus, for SUs 1 through 298,800, the customer is charged $0.15 per SU. For SUs 298,801 through 358,560 (100-120% of the 298,800 baseline SUs), the customer is charged $0.17 per SU, and for the SUs 358,561 through 418,320 (121%-140%) the customer is charged $0.20 per SU. For example, suppose the customer consumes 370,000 SUs during a 30-day billing period. The customer is charged (298,800 SUs×$0.15/SU)+(59,760 SUs×$0.17/SU)+(11,440 SUs× $0.20/SU)=$57,267.20.

Alternatively, pricing bands are established based on the rate of SU consumption rather than total SU consumption. For example, in Table I, the customer has ordered a baseline resource configuration that consumes 415 SUs/Hr at a charge of $0.15 per SU. The customer has access to additional resources, i.e., flex resources, but pays a higher rate for these resources. Using the band limits described above, the customer would have three bands, a baseline band covering an SU consumption rate range of 1-415 SUs/Hr, a 101%-120% band covering an SU consumption rate rage of 416 to 498 SUs/Hr, and a 121%-140% band covering an SU consumption rate range of 499 to of 581 SUs/Hr. If, for a four hour period during one day in a 30 day billing period, the customer uses three additional media servers (MS-C) each delivering 41 SUs/Hr, the customer's charges would be as follows:

Baseline Resources: (415 SUs/Hr×720 Hrs×$0.15/SU)=$44,820.00

Level 1 Flex Resources: 101% to 120%: (83 SUs/Hr×4 Hrs×$0.17/SU)=$56.44

Level 2 Flex Resources: 121% to 140%: (40 SUs/Hr×4 Hrs×$0.20/SU)=$32.00

Total charge: $44,908.44

According to one embodiment of the invention, the rate charged per SU for use of resources in the baseline resource configuration varies with the number of SUs that the customer reserves access to over the baseline resource configuration. For example, for reserving access to no SUs over the SUs provided by the baseline resource configuration, the rate is $0.15 per SU used in the baseline resource configuration. For reserving access to SUs in the 100-120% range of the baseline resource configuration, the charge for SUs used in the baseline resource configuration is $0.17 per SU. For reserving access to SUs in the 121-140% range, the charge for SUs used in the baseline resource configuration is $0.20 per SU.

Referring to the prior example, if a customer has ordered a baseline farm having an SU consumption rate of 415 SUs/Hr, and the customer wants the ability to flex up to 465 SUs/Hr, representing approximately 12% additional resources over the baseline resource configuration, the customer would fall into the 100%-120% band and is charged $0.17 per SU used in the baseline resource configuration. The amount charged for each additional SU over the baseline resource configuration, i.e., for flex resources, may be the same as the rate charged for the baseline resources or may be a different rate, e.g., a flat rate or variable rate, depending upon the requirements of a particular application. The example given is based on the rate of SU consumption model. This billing scheme is also applicable to the total quantity SU consumption model described herein.

The flex billing scheme allows customers to be billed for only the actual usage of additional resources, and not for the additional resources when they are not used. The flex billing scheme is therefore very beneficial for customers whose resource needs vary significantly over the specified period of time. Customers can use additional resources when needed and yet pay only for the actual usage of the additional resources. The customer does not pay for additional resources that are not used.

c) Event Flex Billing

According to the event flex billing scheme, customers are charged for reserving, for a specified period of time, a set of one or more resources in addition to the baseline resource configuration. This approach is ideally suited for covering known demand events or "spikes" that require additional resources for a specific period of time. For example, a particular customer may know that additional resources will be required to cover an increase in demand associated with a particular promotional event that is occurring over a few days.

According to one embodiment of the invention, customers are charged a reservation fee to reserve additional resources. Customers are also charged an additional usage fee for the additional resources from the reserved resources that are actually used. For example, suppose a customer is charged $0.15 per SU for use of the baseline resource configuration in Table I. Suppose further that the customer knows that additional resources will be required to handle an upcoming event. The customer reserves five additional web servers for the next 30 days. The customer is charged a reservation fee of $0.06 per SU to reserve the five additional web servers. The customer is also charged a usage fee of $0.20 per SU for the actual usage of the five additional web servers. Assuming the five additional web servers were used 10 hours during the 30 day period of time, the customer's charges would be as follows:

Baseline Resources: (415 SUs/Hr×720 Hrs×$0.15/SU)=$44,820.00

Event Flex Reservation Fee: (50 SUs/Hr×720 Hrs×$0.06/SU)=$2,160.00

Event Flex Usage Fee: (50 SUs/Hr×10 Hrs×$0.20/SU)=$100.00

Total charge: $47,080.00 d) Open Flex Billing

According to the open flex billing scheme, customers are charged a reservation fee to reserve a set of resources for a specified period of time. Customers are also charged a usage fee for resources, from the reserved resources, that are actually used during the specified period of time. According to the open flex billing scheme, there are no baseline resource configurations assigned to customers. Customers are free to use any number and type of resources as long as their total rate of consumption (SU/Hr) is at or below the rate that was reserved. The specified period of time may vary depending upon the requirements of a particular application, e.g., daily, weekly or monthly periods of time.

For example, a particular customer may be charged $0.05 per SU hour to reserve access to a quantity of resources defined by an SU/Hr consumption rate such as the resources contained in Table I. The particular customer is also charged $0.18 for each SU that is actually consumed. The reserved capacity may be used to deploy any type or number of resources, depending upon the requirements of the particular customer. The customer may change the particular resource configuration at any time, depending upon the requirements of the particular customer. For example, if the customer knows that additional resources will be required because of an increase in demand, the customer may have additional resources added to their particular resource configuration. If the customer wants to change the type of resources deployed, the customer can exchange one type of resource for another. The customer can make any changes so long as the total SU/Hr consumption rate at any given time remains below the total SU/Hr capacity that was currently reserved. As another example, if the particular customer no longer needs as many resources as are provided in the particular resource configuration, then the customer may have resources removed from the particular resource configuration.

3. Other Services and Resources

In some situations, other resources and services are delivered to customers via the devices that have been assigned SU delivery rates. According to one embodiment of the invention, the SU delivery rate and usage of the delivering devices are used to charge for the use of these additional resources and services. For example, suppose that a particular software application is executing on the media server referenced in Table I. To charge for the use of this software application, an additional charge is added to the SUs delivered by the media server. For example, if the additional charge is $0.05/SU delivered by the media server executing the software application, the charges at the end of a 30-day month may be as follows:

Base Media Server MS-C Charges: (41 SU/Hr×720 Hrs×$0.15/SU)=$4,428.00

Software Application Charges: (41 SU/Hr×720 Hrs×$0.05/SU)=$1,476.00

In this manner, the charges for the use of these resources and services are tied to the SU rating of the delivery vehicle and the duration of use. If the customer flexed the media server tier for five hours that month, temporarily adding one additional server with the applicable software application, then the charges might be as follows:

Base Media Server Charges: MS-C (41 SU/Hr×720 Hrs×$0.15/SU)=$4,428.00

Flex level 1 Media Server Charges: (41 SU/Hr×5 Hrs×$0.17/SU)=$34.85

Software Charges: (41 SU/Hr×725 Hrs×$0.05/SU)=$1,486.25

In this example, these other services and resources are not assigned separate SU delivery rates, but are instead based upon the SU delivery rates of the devices that are acting as a delivery vehicle for that product or service. In the prior example, the rate per SU charged for use of the software application ($0.05/SU) was less than the rate charged for use of the underlying resources. The invention is not limited to this example, and a higher charge per SU may be applied to other services and resources depending upon the requirements of a particular application.

4. Implementation Considerations

The approaches described herein for determining an amount to bill a customer for the use of resources may be implemented in a variety of applications and contexts and the invention is not limited to any particular application or context. For example, the approach may be integrated into a billing or rental system. As another example, the approach may be implemented as a stand-alone mechanism that interfaces with a billing or rental system. The particular mechanism that determines the amounts to bill customers for the use of resources based upon usage data and value data does not necessarily have to determine the usage data or the value data. The mechanism may determine an amount to bill a customer for the use of resources based upon usage data and value data that is made available to the mechanism. For example, the usage data and value data may be stored on a storage device and accessed by the mechanism as necessary. Alternatively, the mechanism may participate in determining, e.g., generating, the usage data and value data, depending upon the requirements of a particular application. The approach may be implemented in hardware circuitry, in computer software, or a combination of hardware circuitry and computer software and is not limited to a particular hardware or software implementation.

A Customer Visible Control Plane API

In another alternative, the capacity of a VSF may be controlled by providing the customer with an application programming interface (API) that defines calls to the control plane for changing resources. Thus, an application program prepared by the customer could issue calls or requests using the API to ask for more servers, more storage, more bandwidth, etc. This alternative may be used when the customer needs the application program to be aware of the computing grid environment and to take advantage of the capabilities offered by the control plane.

Nothing in the above-disclosed architecture requires the customer to modify its application for use with the computing grid. Existing applications continue to work as they do in manually configured server farms. However, an application can take advantage of the dynamism possible in the computing grid, if it has a better understanding of the computing resources it needs based on the real-time load monitoring functions provided by the control plane. An API of the foregoing nature, which enables an application program to change the computing capacity of a server farm, is not possible using existing manual approaches to constructing a server farm.

Automatic Updating and Versioning

Using the methods and mechanisms disclosed herein, the control plane may carry out automatic updating and versioning of operating system software that is executed in computing elements of a VSF. Thus, the end user or customer is not required to worry about updating the operating system with a new patch, bug fix, etc. The control plane can maintain a library of such software elements as they are received and automatically distribute and install them in computing elements of all affected VSFs.

Implementation Mechanisms

The computing elements and control plane may be implemented in several forms and the invention is not limited to any particular form. In one embodiment, each computing element is a general purpose digital computer having the elements shown in FIG. 13 except for non-volatile storage device 1310, and the control plane is a general purpose digital computer of the type shown in FIG. 13 operating under control of program instructions that implement the processes described herein.

Figure 13:
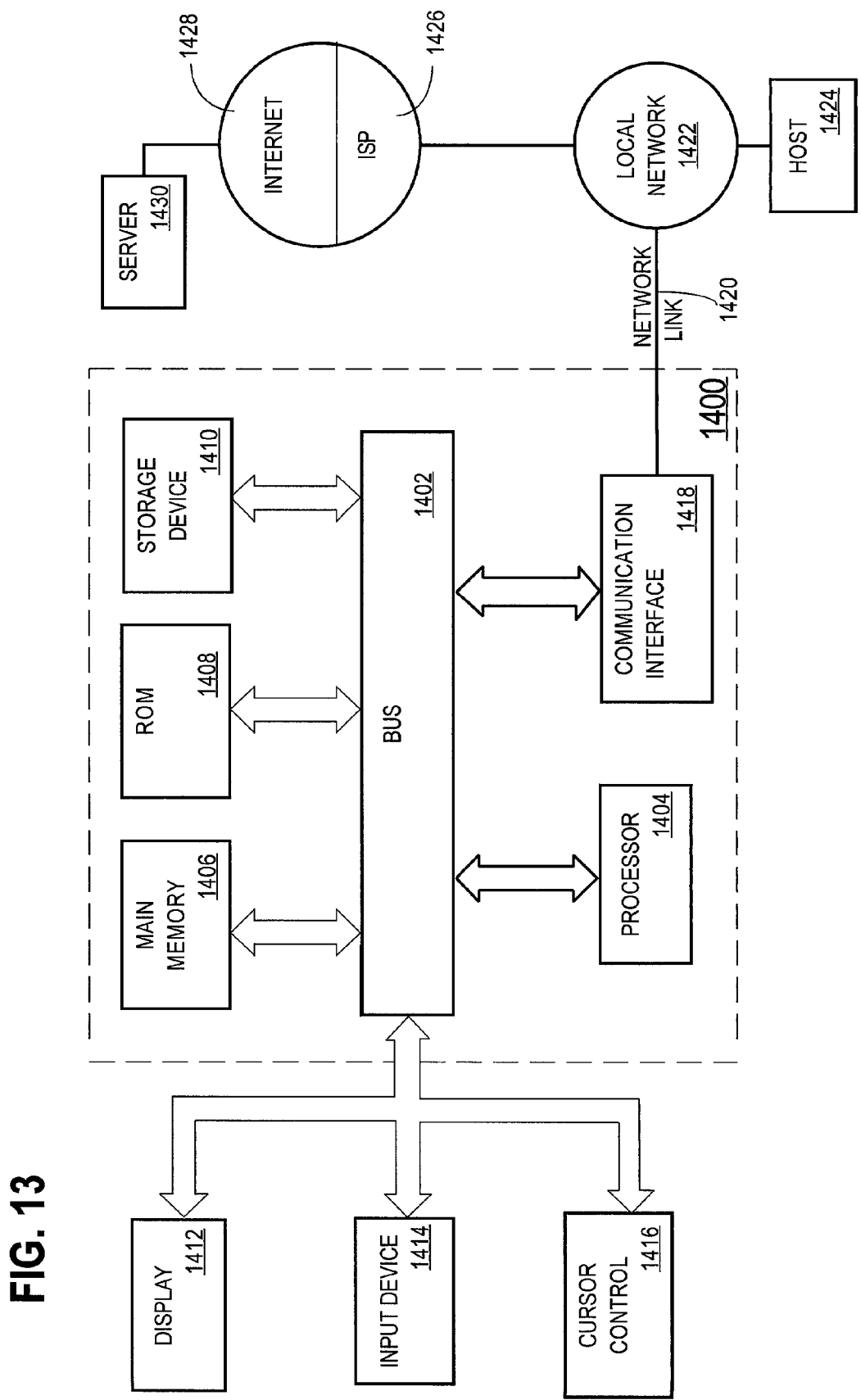
FIG. 13 is a block diagram of a computer system with which an embodiment may be implemented.

FIG. 13 is a block diagram that illustrates a computer system 1300 upon which an embodiment of the invention may be implemented. Computer system 1300 includes a bus 1302 or other communication mechanism for communicating information, and a processor 1304 coupled with bus 1302 for processing information. Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

The invention is related to the use of computer system 1300 for determining an amount to bill a customer for the use of resources. According to one embodiment of the invention, an approach for determining an amount to bill a customer for the use of resources is provided by computer system 1300 in response to processor 1304 executing one or more sequences of one or more instructions contained in main memory 1306. Such instructions may be read into main memory 1306 from another computer-readable medium, such as storage device 1310. Execution of the sequences of instructions contained in main memory 1306 causes processor 1304 to perform the process steps described herein. One or more processors in a multi-processing arrangement may also be employed to execute the sequences of instructions contained in main memory 1306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1304 for execution. Such a medium may take many forms, including but not limited to, non-volatile media, volatile media, and transmission media. Non-volatile media includes, for example, optical or magnetic disks, such as storage device 1310. Volatile media includes dynamic memory, such as main memory 1306. Transmission media includes coaxial cables, copper wire and fiber optics, including the wires that comprise bus 1302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1304 for execution. For example, the instructions may initially be carried on a magnetic disk of a remote computer. The remote computer can load the instructions into its dynamic memory and send the instructions over a telephone line using a modem. A modem local to computer system 1300 can receive the data on the telephone line and use an infrared transmitter to convert the data to an infrared signal. An infrared detector coupled to bus 1302 can receive the data carried in the infrared signal and place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the worldwide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are exemplary forms of carrier waves transporting the information.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318. In accordance with the invention, one such downloaded application provides for an approach for determining an amount to bill a customer for the use of resources as described herein.

The received code may be executed by processor 1304 as it is received, and/or stored in storage device 1310, or other non-volatile storage for later execution. In this manner, computer system 1300 may obtain application code in the form of a carrier wave.

The computing grid disclosed herein may be compared conceptually to the public electric power network that is sometimes called the power grid. The power grid provides a scalable means for many parties to obtain power services through a single wide-scale power infrastructure. Similarly, the computing grid disclosed herein provides computing services to many organizations using a single wide-scale computing infrastructure. Using the power grid, power consumers do not independently manage their own personal power equipment. For example, there is no reason for a utility consumer to run a personal power generator at its facility, or in a shared facility and manage its capacity and growth on an individual basis. Instead, the power grid enables the wide-scale distribution of power to vast segments of the population, thereby providing great economies of scale. Similarly, the computing grid disclosed herein can provide computing services to vast segments of the population using a single wide-scale computing infrastructure.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for determining an amount to be billed to a customer for using and reserving computing resources, the method comprising:

determining usage data that indicates usage, by the customer during a specified period of time, of a set of one or more computing resources assigned exclusively to the customer, wherein over time, computing resources may be de-allocated from the set of one or more computing resources assigned exclusively to the customer and additional computing resources may be allocated to the set of one or more computing resources assigned exclusively to the customer from a plurality of computing resources; and in a computer system determining the amount to be billed to the customer based upon the usage data, value data that specifies a number of service units that each computing resource from the set of one or more computing resources is capable of providing per unit time, and a reservation fee for reserving for the customer other computing resources from the plurality of computing resources that are not included in the set of one or more computing resources assigned exclusively to the customer.

2. The method as recited in claim 1, wherein:
the usage data indicates usage, during the specified period of time, of each computing resource from the set of one or more computing resources, and
the step of determining the amount to be billed to the customer based upon the usage data and value data includes determining the amount to be billed to the customer based upon the usage of each computing resource from the set of one or more computing resources during the specified period of time and the value data.

3. The method as recited in claim 1, wherein:
the usage data specifies, for each computing resource from the set of one or more computing resources, an amount of time that each computing resource was used during the specified period of time, and
the step of determining the amount to be billed to the customer based upon the usage data and value data includes determining the amount to be billed to the customer based the amount of time that each computing resource was used during the specified period of time.

4. The method as recited in claim 3, wherein the step of determining the amount to be billed to the customer based upon the number of service units that each computing resource is capable of providing per unit time and the amount of time that each computing resource was used during the specified period of time includes determining the amount to be billed to the customer based upon the number of service units that each computing resource is capable of providing per unit time, the amount of time that each computing resource was used during the specified period of time and an amount to be charged per service unit.

5. The method as recited in claim 1, wherein:
the method further comprises determining additional usage data that indicates usage, by the customer during the specified period of time, of one or more additional computing resources from the plurality of computing resources, and
the step of determining the amount to be billed to the customer based upon the usage data and value data includes determining the amount to be billed to the customer based upon the usage data, the value data, the additional usage data and additional value data wherein the value data specifies a number of service units that each of the one or more additional computing resources is capable of providing per unit time.

6. The method as recited in claim 1, wherein the set of one or more computing resources comprise an initial computing resource configuration.

7. The method as recited in claim 1, wherein the set of one or more computing resources comprise a virtual server farm.

8. The method as recited in claim 1, wherein the plurality of computing resources includes one or more storage resources.

9. The method as recited in claim 1, wherein one or more computing resources includes one or more processors.

10. The method as recited in claim 8, wherein the one or more storage resources include one or more volatile storage devices.

11. The method as recited in claim 10, wherein the one or more storage resources include one or more non-volatile storage resources.

12. The method as recited in claim 11, where in the one or more non-volatile storage resources include one or more disks.

13. The method as recited in claim 1, wherein the plurality of computing resources includes one or more computer software resources.

14. The method as recited in claim 1, wherein the plurality of computing resources includes one or more communications link resources.

15. The method as recited in claim 14, wherein the one or more communications link resources includes one or more Internet connections.

16. A computer-readable medium carrying instructions for determining an amount to bill a customer for using and reserving computing resources, the instructions-including instructions which, when executed by one or more processors in a computer system, cause:
determining usage data that indicates usage, by the customer during a specified period of time, of a set of one or more computing resources assigned exclusively to the customer, wherein over time, computing resources may be de-allocated from the set of one or more computing resources assigned exclusively to the customer and additional computing resources may be allocated to the set of one or more computing resources assigned exclusively to the customer from a plurality of computing resources; and
determining the amount to be billed to the customer based upon the usage data, value data that specifies a number of service units that each computing resource from the set of one or more computing resources is capable of providing per unit time, and a reservation fee for reserving for the customer other computing resources from the plurality of computing resources that are not included in the set of one or more computing resources assigned exclusively to the customer.

17. The computer-readable medium as recited in claim 16, wherein:
the usage data indicates usage, during the specified period of time, of each computing resource from the set of one or more computing resources, and
the step of determining the amount to be billed to the customer based upon the usage data and value data includes determining the amount to be billed to the customer based upon the usage of each computing resource from the set of one or more computing resources during the specified period of time and the value data.

18. The computer-readable medium as recited in claim 16, wherein:
the usage data specifies, for each computing resource from the set of one or more computing resources, an amount of time that each computing resource was used during the specified period of time, and
the step of determining the amount to be billed to the customer based upon the usage data and value data includes determining the amount to be billed to the customer based upon the amount of time that each computing resource was used during the specified period of time.

19. The computer-readable medium as recited in claim 18, wherein the step of determining the amount to be billed to the customer based upon the number of service units that each computing resource is capable of providing per unit time and the amount of time that each computing resource was used during the specified period of time includes determining the amount to be billed to the customer based upon the number of service units that each computing resource is capable of providing per unit time, the amount of time that each computing resource was used during the specified period of time and an amount to be charged per service unit.

20. The computer-readable medium as recited in claim 16, wherein:
- the computer-readable medium includes one or more additional instructions which, when executed by the one or more processors, cause the one or more processors to perform the step of determining additional usage data that indicates usage, by the customer during the specified period of time, of one or more additional computing resources from the plurality of computing resources, and
- the step of determining the amount to be billed to the customer based upon the usage data and value data includes determining the amount to be billed to the customer based upon the usage data, the value data, the additional usage data and additional value data wherein the value data specifies a number of service units that each of the one or more additional computing resources is capable of providing per unit time.

21. The computer-readable medium as recited in claim 16, wherein the set of one or more computing resources comprise an initial computing resource configuration.

22. The computer-readable medium as recited in claim 16, wherein the set of one or more computing resources comprise a virtual server farm.

23. The computer-readable medium as recited in claim 16, wherein one or more computing resources includes one or more processors.

24. The computer-readable medium as recited in claim 16, wherein the plurality of computing resources includes one or more storage resources.

25. The computer-readable medium as recited in claim 24, wherein the one or more storage resources include one or more volatile storage devices.

26. The computer-readable medium as recited in claim 25, wherein the one or more storage resources include one or more non-volatile storage resources.

27. The computer-readable medium as recited in claim 26, where in the one or more non-volatile storage resources include one or more disks.

28. The computer-readable medium as recited in claim 16, wherein the plurality of computing resources includes one or more computer software resources.

29. The computer-readable medium as recited in claim 16, wherein the plurality of computing resources includes one or more communications link resources.

30. The computer-readable medium as recited in claim 29, wherein the one or more communications link resources includes one or more Internet connections.

31. A billing apparatus for determining an amount to bill a customer comprising:
- a memory configured to store usage data and value data, wherein the usage data indicates usage, by the customer during a specified period of time, of a set of one or more computing resources assigned exclusively to the customer, wherein over time, computing resources may be de-allocated from the set of one or more computing resources assigned exclusively to the customer and additional computing resources may be allocated to the set of one or more computing resources assigned exclusively to the customer from a plurality of computing resources and wherein the value data specifies a number of service units that each computing resource from the set of one or more computing resources is capable of providing per unit time; and
- a billing mechanism communicatively coupled to the memory and configured to determine the amount to bill to the customer based upon both the usage data, value data and a reservation fee for reserving for the customer other computing resources from the plurality of computing resources that are not included in the set of one or more computing resources assigned exclusively to the customer.

* * * * *